United States Patent [19]

Nakahara et al.

[11] Patent Number: 5,752,009
[45] Date of Patent: May 12, 1998

[54] RECORDING MEDIUM FOR ELECTRONIC PUBLICATIONS INCLUDING MULTIPLE FORMAT EMULATION

[75] Inventors: Masaru Nakahara; Kazuo Nakashima; Kenichi Utsumi, all of Kawasaki, Japan

[73] Assignee: Fujitsu Limited, Kawasaki, Japan

[21] Appl. No.: 757,642

[22] Filed: Dec. 2, 1996

Related U.S. Application Data

[63] Continuation of Ser. No. 255,487, Jun. 8, 1994, abandoned.

[30] Foreign Application Priority Data

Jul. 16, 1993 [JP] Japan ................ 5-176613

[51] Int. Cl.$^6$ .................................. G06F 15/40
[52] U.S. Cl. .................. 395/500; 369/13; 369/30
[58] Field of Search ................... 395/500, 712; 369/13, 30

[56] References Cited

U.S. PATENT DOCUMENTS

| | | | |
|---|---|---|---|
| 4,866,601 | 9/1989 | Dulac et al. | 395/700 |
| 4,918,661 | 4/1990 | Yamauchi | 369/30 |
| 4,947,367 | 8/1990 | Chang et al. | 395/500 |
| 5,166,921 | 11/1992 | Matsui | 369/275.3 |
| 5,321,673 | 6/1994 | Okazaki | 369/13 |
| 5,410,676 | 4/1995 | Huang et al. | 395/500 |

FOREIGN PATENT DOCUMENTS

| | | |
|---|---|---|
| 0294489 | 12/1988 | European Pat. Off. |
| 0545472 | 6/1993 | European Pat. Off. |
| 0565281 | 10/1993 | European Pat. Off. |
| 60-197958 | 10/1985 | Japan |
| 63-014372 | 1/1988 | Japan |
| 2115995 | 4/1990 | Japan |
| 2123522 | 5/1990 | Japan |
| 3156543 | 7/1991 | Japan |
| 4184650 | 7/1992 | Japan |

*Primary Examiner*—Krisna Lim
*Attorney, Agent, or Firm*—Greer, Burns & Crain, Ltd.

[57] ABSTRACT

An optical disk is divided into a plurality of sections at least one of which (a first section) is made a section (formatted in MS-DOS, for example) having a format different from the logical format of a CD-ROM. Publication data is optically recorded in at least one section (a second section) of the sections other than the first section in accordance with the CD-ROM logical format. A CD-ROM utilization tool that utilizes publication data in the CD-ROM logical format and a CD-ROM emulator for converting a request for access to the CD-ROM logical section issued by the CD-ROM utilization tool to a request for access to the optical disk are recorded in the first section.

42 Claims, 32 Drawing Sheets

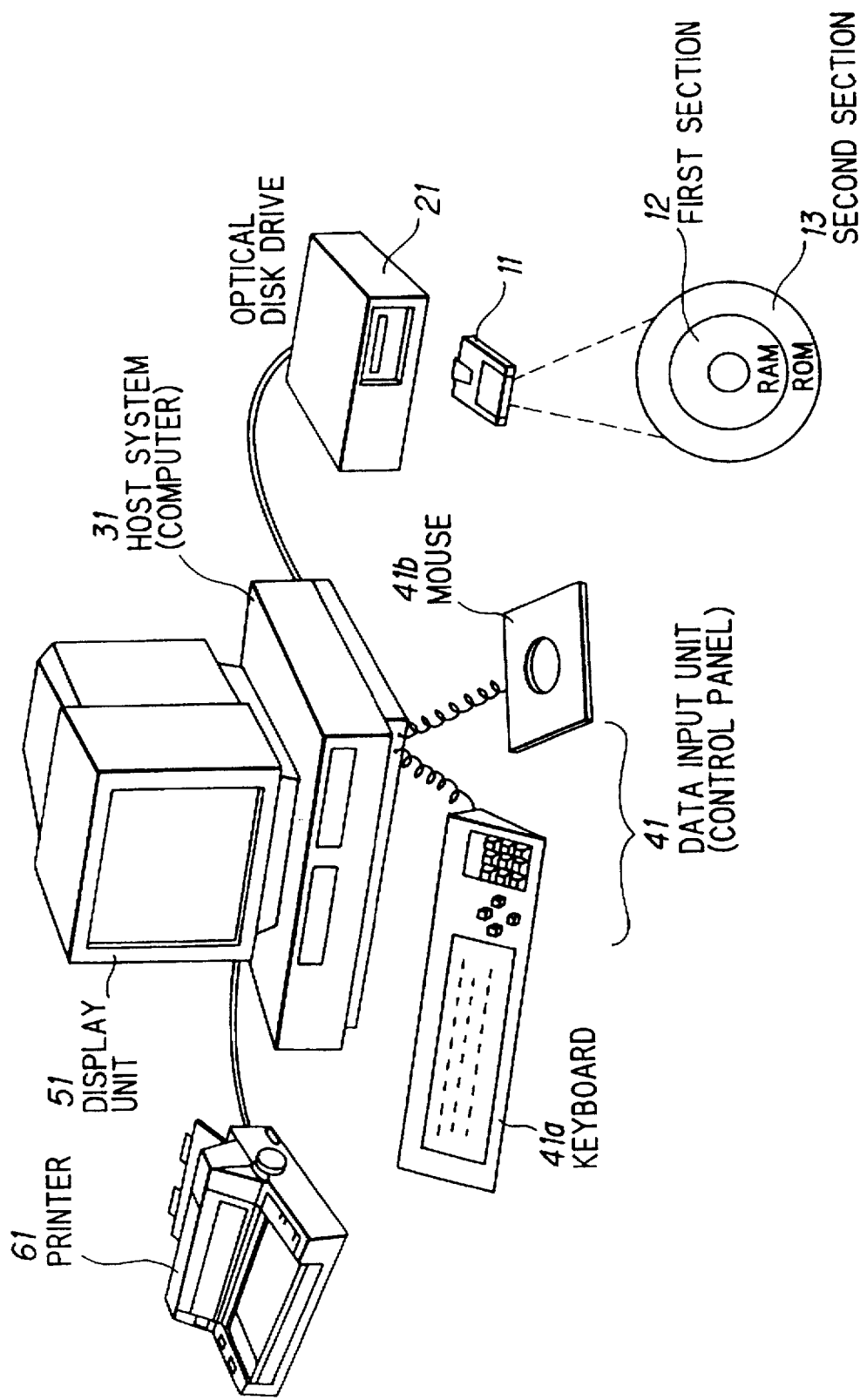

FIG. 17

| BYTES | 10 | 25 | 200 | 490 |
|---|---|---|---|---|
| DATA (HEXADECIMAL) | 01 | 24 | FF | 32 |

TEST·EXE FILE

WORD PROCESSING SOFTWARE A·EXE          SAMPLE·TXT FILE

RECORDING MEDIUM FOR ELECTRONIC PUBLICATIONS INCLUDING MULTIPLE FORMAT EMULATION

This is a continuation of application Ser. No. 08/255,487 filed Jun. 8, 1994, now abandoned.

BACKGROUND OF THE INVENTION

This invention relates to a recording medium, a method of controlling the same and a system utilizing electronic publications. More specifically, the invention relates to a recording such as an optical disk medium, which is utilized as an external storage medium of a computer and on which a dictionary or publishing information is stored, a method of controlling the recording medium and a system utilizing electronic publications.

The growing use of personal computers and word processors in industry and in the home has been accompanied by increasing utilization of electronic documents, in which written matter such as dictionaries, manuals, reference books and glossaries heretofore provided in the form of paper is converted to electronic form.

Since such written matter in electronic form is recorded digitally, identical copies can be created with facility and deletions or changes can be made easier than with paper. However, since written matter can a involve copyright protection, controls must be imposed so that a user cannot alter an electronic document at will. In addition, written matter in electronic form must be made difficult to copy in order to protect the rights of the writer.

To this end, CD-ROMs are being widely used as recording media in order to provide written matter in electronic form, referred to as electron publications. As shown in FIG. 30A, a CD-ROM of this type is so designed that information is recorded as pits 2 in a transparent plastic layer 1, a metal film (e.g., aluminum) 3 is formed on the pit surface as by vapor deposition, and a protective layer 4 is provided on the metal film 3. In a CD-ROM of this kind, the signal layer (the pits and metal film) is irradiated with a laser beam LB via an objective lens OL, as illustrated in FIG. 30B. When this is done, almost all of the light returns intact from locations devoid of pits, whereas the light is refracted by pits at locations where the pits are present. Only some of the returned light actually returns to the objective lens OL since part of the light falls outside the visual field of the objective lens. Accordingly, the information can be read by using a photodiode to detect the returning light.

Thus, with a CD-ROM, information is recorded in the form of pits. This means that the information is less likely to be damaged in comparison with magnetic recording. Moreover, the information cannot be rewritten and a large quantity of information can readily be produced on a large number of disks by stamping.

On the other hand, a shortcoming possessed by CD-ROMs is slow access speed, which is the result of CD-ROM specifications. Another drawback with CD-ROMs is that data cannot be recorded or updated. When written matter such a dictionary, manual, reference book or glossary is read, the reader may underline certain passages or write notes in the margins in order to enhance understanding, or may write down the solutions to equations. If information created so as to be readily used by the user, such as underlining and annotations, could be written freely and displayed simultaneously along with the content of the publication in electronic publications as well, then an electronic publication could be read and referred to just as if it were a publication on paper. This would make such electronic publications much more user friendly. With CD-ROMs, however, such utilization is difficult because data cannot be recorded and updated.

Accordingly, consideration has been given to using writable magneto-optical disks (optical disks) as the recording media for electronic publications. A magneto-optical disk comprises a substrate and an amorphous, magnetic thin film such as TbFeCo deposited on the substrate. Such a disk utilizes a property according to which the retentiveness necessary for magnetic reversal of the magnetic film diminishes in conformity with a rise in temperature (retentiveness is zero at the Curie point). More specifically, recording and erasure are performed by irradiating the disk with a laser beam to raise the temperature of the disk medium to the vicinity of 200° C., thereby weakening retentiveness, applying a weak magnetic field under this condition and controlling the direction of magnetization. Accordingly, as illustrated in FIG. 31A, an upwardly directed magnetic field is applied by a writing coil 6 under a condition in which the direction of magnetization of a magnetic film 5 is pointed downward. When a portion at which the direction of magnetization is desired to be changed is irradiated with a laser beam LB via an objective lens OL, as shown in FIG. 31B, the direction of magnetization of this portion reverses, i.e., is pointed upward. This makes it possible to record information. When information is read, the magnetic film 5 is irradiated with a laser beam LB having a plane of polarization along the y axis, as illustrated in FIG. 31C. When this is done, reflected light LBO, in which the plane of polarization has been rotated by $\theta_k$ in the clockwise direction owing to the magnetic Kerr effect, is obtained in the portion where magnetization is downwardly directed. In the portion where magnetization is upwardly directed, reflected light LB1, in which the plane of polarization has been rotated by $\theta_k$ in the counter-clockwise direction owing to the magnetic Kerr effect, is obtained. Accordingly, the direction of magnetization, namely information, can be read by detecting the state of polarization of reflected light.

With such a magneto-optical disk (referred to as a "full RAM disk"), it is possible to write data and the capacity thereof as a storage medium is similar to that of a CD-ROM. Another advantage is that the specifications of a full RAM disk allow it to be read at a speed higher than that of a CD-ROM.

Magneto-optical disks include, in addition to the above-mentioned full RAM disk on the entire surface of which data is capable of being written, a so-called "partial ROM disk" part of which is an area (a RAM area) capable of written and the remainder of which is an area (a ROM area) exclusively for playback, and a so-called "full ROM disk" the entire surface of which is a ROM area.

A partial ROM disk has the advantages of a full RAM disk in addition to the following advantages: ① A large quantity of publication information can easily be recorded in the ROM area (11a in FIG. 32A) by stamping, in the same manner as the CD-ROM. ② The RAM area (11b in FIG. 32A) can be annotated and underlined. ③ Electronic publications having a large number of pages can be created with ease. Furthermore, in the case of the full ROM disk, though writing is not possible, this disk not only has merits similar to those of a CD-ROM but is also advantageous in terms of its high access speed.

FIGS. 32A, 32B and 32C are diagrams for describing the construction of a partial ROM magneto-optical disk having a diameter of, say, 3.5 inches. FIG. 32A is a schematic plan view, 32B a partially enlarged explanatory view of the partial ROM magneto-optical disk, and 32C a partial sectional view of the same. A partial ROM magneto-optical disk 11 has 10,000 tracks per side, in which the tracks are concentric circles or spiral in form. All of the tracks are divided into 25 sectors ST. Each sector ST is composed of 512 bytes. The header of each sector ST is provided with an address field AF, with the rest of the sector being a data field DF. Address information is recorded in the address field AF and data is stored in the data field DF. The address information includes a sector mark, a track address, a sector address and a preamble for reproducing a synchronizing signal. The inner side and outer side of an accessible area (storage area) 11' are provided with a defect management area DMA. The inner and outer circumferential portions of the defect management area DMA are provided respectively with inner and outer control tracks (referred to as inner and outer "control zones") TRc with a disk definition sector DDS. The region on the outer side of the accessible area 11' is the ROM area 11a, and the region on the inner side of the accessible area 11' is the RAM area 11b.

As shown in FIG. 32C, the partial ROM magneto-optical disk 11 is constructed by preparing a transparent plastic layer (substrate) PLS, in which pits PT are formed in part of the area by stamping, depositing a recording layer (recording film) MGF on the plastic layer PLS, and forming a protective layer PRF on the recording film MGF. The area in which the pits PT are formed serves as the ROM area, and the area devoid of pits PT serves as the RAM area.

Thus, an optical magnetic disk makes it possible for both the provider and the user to utilize electronic publications more favorably in comparison with a CD-ROM. In addition, such a disk is much more user friendly.

Almost all CD-ROMs are in conformity with the ISO 9660 format in view of compatibility among different computers. The ISO 9660 format is the standard format of CD-ROMs and decides the composition of a volume (the term applied to the entirety of a single CD-ROM) and the control structure of a directory and file. Because the data structure of an electronic publication using a CD-ROM also possesses the composition of a volume and file in conformity with ISO 9660, and because almost all currently available electronic publications are provided in the form of CD-ROMs, almost all tools for converting and creating publication data for electronic publications conform to ISO 9660. Almost all tools for retrieving and displaying electronic publications also conform to ISO 9660 for the same reasons. (These are referred to as CD-ROM utilization tools.)

Though a magneto-optical disk used as a storage medium for electronic publications has many advantages over a CD-ROM, as mentioned above, such disks are not yet in wide use. Therefore, in order to employ a magneto-optical disk as a storage medium for electronic publications, assets for electronic publications on magneto-optical disks must be constructed from scratch. These include ① publication data made to conform to a format for magneto-optical disks, ② a data converting tool made to conform to the format for magneto-optical disks and ③ a retrieval and display tool. This involves a great deal of time and expense for development.

Accordingly, it is contemplated to take the data in the ISO 9660 format, namely publication data that has been accumulated in the realm of electronic publications stored on CD-ROMs, and record this data on a magneto-optical disk as is. However, since CD-ROM devices and magneto-optical disk devices have different methods of access, existing CD-ROM utilization software cannot be used as is.

Further, since a user can make an unlawful copy of a magneto-optical disk more easily in comparison with a CD-ROM, a problem that arises is that it is easy to violate a copyright. Specifically, with a system running on MS-DOS (the Microsoft Disk Operating System), for example, a CD-ROM cannot be accessed unless use is made of a special tool. However, if a magneto-optical disk is formatted according to MS-DOS, then the user of this MS-DOS system can access the magneto-optical disk, read the data and easily copy the data to another magneto-optical disk.

Furthermore, with a system (computer system) that utilizes a CD-ROM electronic publication, only publication data is recorded on the CD-ROM and the retrieval software is recorded on another storage medium such as a hard disk or floppy disk. Such a system utilizing a CD-ROM electronic publication is inconvenient to use.

SUMMARY OF THE INVENTION

Accordingly, an object of the present invention is to provide a recording medium such as an optical disk medium, a method of controlling the same, and a system utilizing electronic publications, in which publication data that has been accumulated in the world of CD-ROM electronic publications and the like, a tool for creating and converting this data and an utilization tool such as a CD-ROM utilization tool can be put to use without being wasted.

Another object of the present invention is to provide an optical disk medium, a method of controlling the same, and a system utilizing electronic publications, in which a smooth transition can be made from a CD-ROM publication to a publication on an optical disk.

A further object of the present invention is to provide a recording medium such as an optical disk medium, a method of controlling the same, and a system utilizing electronic publications, in which unlawful copying by a user can be prevented and data copyright protected.

Still another object of the present invention is to provide a recording medium such as an optical disk medium, a method of controlling the same, and a system utilizing electronic publications, in which publication data, a utilization tool and decoding software can be provided simultaneously on one large-capacity recording medium to improve operability and user friendliness.

According to the present invention, the foregoing objects are attained by providing a recording medium such as an optical disk comprising a first section for storing software, a second section for storing a publication data converted to a predetermined physical format from an original physical format, and wherein said first section has an area for storing software, said software for converting a command for reading the publication data in accordance with the original physical format to a command for reading the publication data from said second section.

Further, according to the present invention, the foregoing objects are attained by providing a method of processing publication data in an electronic publication system comprising the steps of (a) providing a recording medium for storing data with a predetermined physical format, (b) providing publication data converted to the predetermined physical format from an original physical format, (c) providing a first software for reading the publication data in accordance with the original physical format and a second software for converting a command for reading the publication data issued by the first software to a command for reading the publication data from the recording medium, (d) converting a command for reading the publication data issued by said first software to a command for reading the publication data from the recording medium by using the second software and (e) reading publication data from the recording medium using the converted command.

Further, the foregoing objects are attained by recording publication data on a recording medium such as an optical disk medium upon encrypting the publication data, providing decoding software for restoring the encrypted publication data to the original publication data, and decrypting the encrypted publication data, which has been read from the recording medium, by the decrypting software.

Further, the foregoing objects are attained by providing a method of processing publication data provided on an optical disk comprising the steps of providing encrypted information in a recording area of an optical disk, providing data which is necessary for decrypting said encrypted information on an area where read-only information is recorded in the form of pits created by stamping, determining whether the data necessary for decrypting the encrypted information is present in a read-only area when said encrypted information is decrypted and refraining from executing decrypting if said data is not present in the read-only area, and executing decrypting if said data is present in the read-only area.

Further, the foregoing objects are attained by providing a system utilizing electronic publications, comprising: a recording medium for storing publication data converted to a predetermined physical format from an original physical format;
 first storage means for storing a first software for reading the publication data with the predetermined physical format;
 second storage means for storing a second software for converting a command for reading the publication data issued by the first software to a command for reading the publication data from the recording medium;
 a drive for reading the publication data from the recording medium based upon the converted command; and
 a processing unit for storing the first and second software read from the first and second storage means, issuing the command for reading the publication data by the first software, and converting the command to a command for reading the publication data from the recording medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram for describing a system utilizing electronic publications on a magneto-optical disk according to the present invention;

FIG. 17 is a diagram for describing a stamper ID;

DESCRIPTION OF THE PREFERRED EMBODIMENTS

(1) Description of General Features of the Invention

Figure 1:
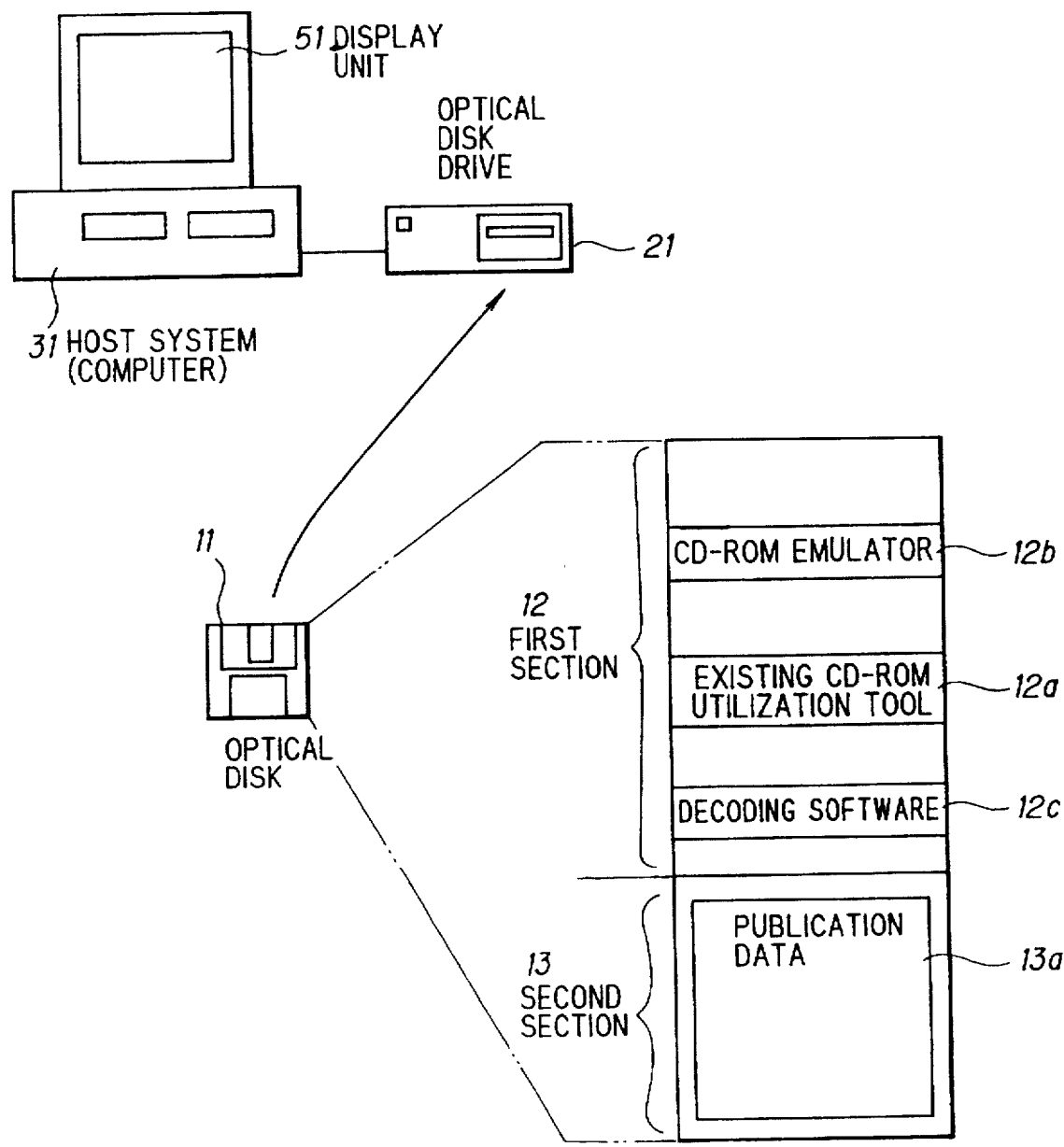
FIG. 1 is a diagram for describing the principles of the present invention.

FIG. 1 is a diagram for describing the general features of the present invention, and FIG. 2 is a diagram for describing the operating principles of a CD-ROM emulator.

With reference to FIGS. 1 and 2, there are shown an optical disk 11, an optical disk drive 21, a CD-ROM drive 21', a host system 31 and a display unit 51. The optical disk 11 has a plurality of sections (first and second sections) 12, 13. Numeral 13a denotes publication data in a CD-ROM logical format, 12a software utilizing the publication data having the CD-ROM logical format (this software is a tool for utilizing an already existing CD-ROM), 12b software for converting a CD-ROM access request issued by the existing CD-ROM utilization tool to an optical-disk access request (this software is a CD-ROM emulator), and 12c decoding software for restoring publication data that has been encrypted and recorded.

The optical disk 11 is partitioned into a plurality of sections in at least one of which (the second section 13) the publication data 13a is optically recorded in accordance with the CD-ROM logical format. At least one section (the first section 12) other than the above-mentioned sections is made a section having a format (e.g., the MS-DOS format) different from the CD-ROM logical format. ① The CD-ROM utilization tool 12a, which utilizes the publication data 13a having the CD-ROM logical format, and ② the CD-ROM emulator 12b, which converts a request for access to the CD-ROM logical section issued by the CD-ROM utilization tool 12a to a request for access to the optical disk, are recorded in the first section 12. Thus, an electronic publication on an optical disk is constructed.

If an electronic publication on an optical disk is thus constructed, publication data that has been accumulated as an electronic publication on a CD-ROM can be optically recorded as is in the second section (an area for saving publication data) 13 in accordance with the CD-ROM logical format (the ISO 9660 format). As a result, time no longer is necessary for creating publication data, for developing and creating a conversion tool for converting publication data in the ISO format to the MS-DOS format, and for carrying out the conversion operation.

The existing CD-ROM utilization tool 12a is a tool effective only in the CD-ROM drive 21' and cannot be used in the optical disk drive 21. By providing the CD-ROM emulator, however, the existing CD-ROM utilization tool 12a can be used in an optical disk as well. In other words, as shown in FIG. 2A, the CD-ROM drive 21' accesses a CD-ROM based upon a data-read command of the existing CD-ROM utilization tool 12a and is capable of reading and outputting desired data from the CD-ROM. However, the optical disk drive 21 cannot make use of the existing CD-ROM utilization tool 12a.

Figure 2B:
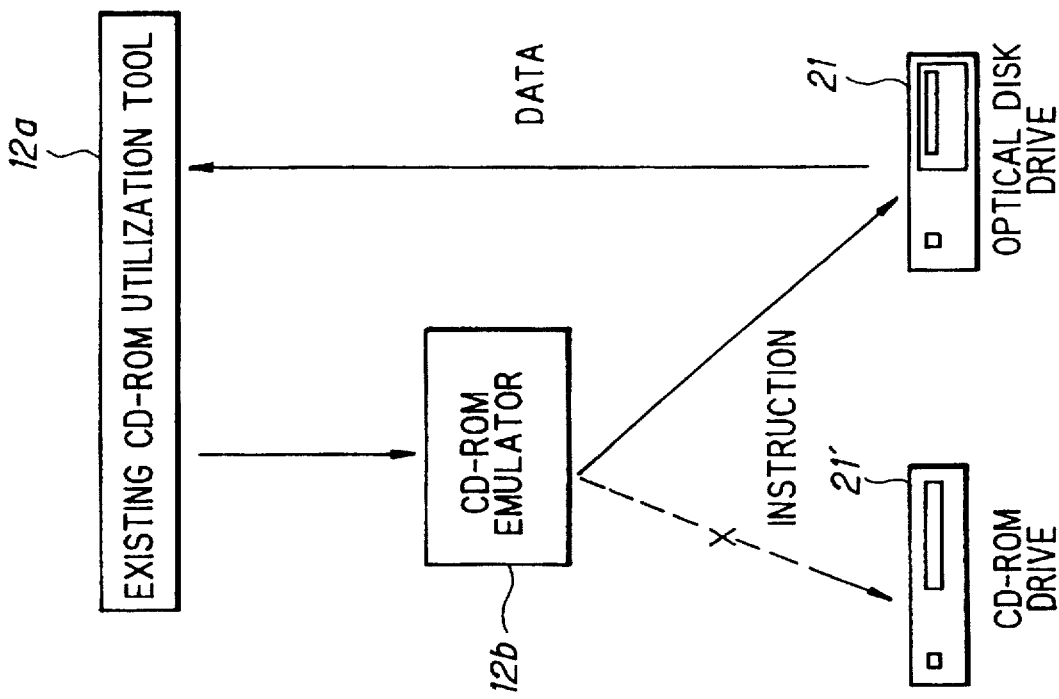
FIGS. 2A and 2B are diagrams for describing the operating principles of a CD-ROM emulator.
Figure 2A:
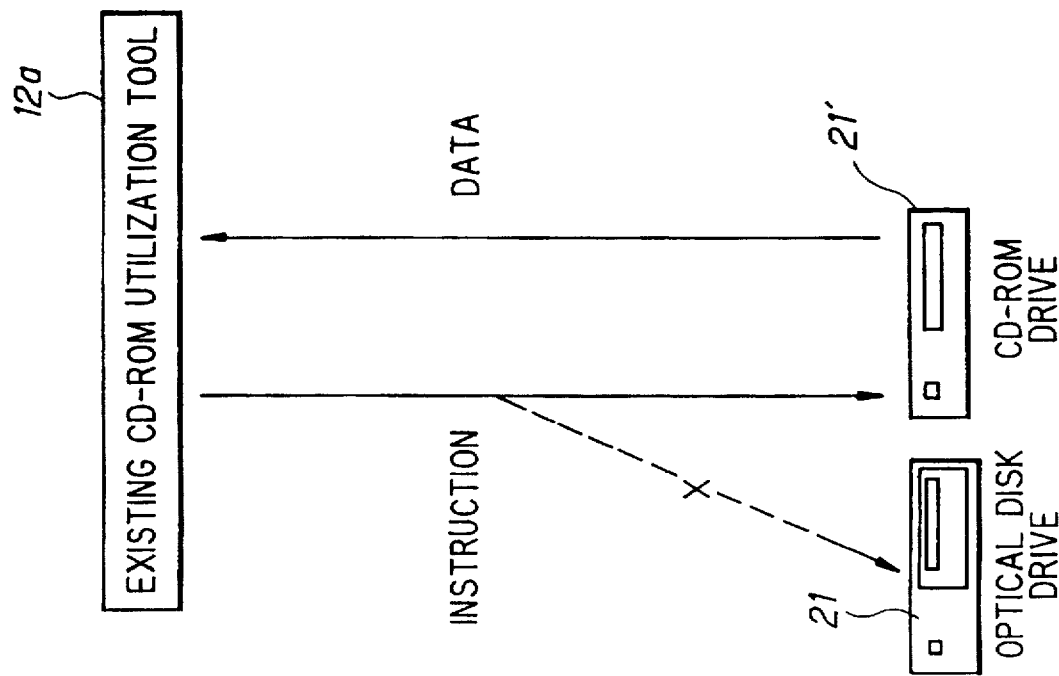

Accordingly, the CD-ROM emulator 12b is inserted between the existing CD-ROM utilization tool 12a and the optical disk drive 21, as shown in FIG. 2B. The CD-ROM emulator 12b performs monitoring to determine whether a data-read instruction (CD-ROM access request) is being sent from the existing CD-ROM utilization tool 12a to the CD-ROM drive 21'. If a request for access to the CD-ROM has been issued, the CD-ROM emulator 12b changes the destination accessed to the optical disk drive 21.

By adopting this arrangement, read-out of the publication data 13a from the second section 13 of the optical disk 11 is performed when the software of the existing CD-ROM utilization tool 12a is implemented. This saving area may be regarded as if it were a single CD-ROM. As a result, a publication utilization tool for an optical disk need not be developed and created on the developer side, and a CD-ROM utilization tool used thus far can be employed directly as the utilization tool of an optical disk publication on the user side.

Thus, an advantage obtained is that publication data, which is in accordance with the CD-ROM logical format (the ISO 9660 format), accumulated in the world of CD-ROM electronic publications, a tool for creating and converting this data and a CD-ROM utilization tool can be simultaneously and efficiently put to use.

Further, the optical disk is provided with a ROM area exclusively for playback, in which publication data in the CD-ROM logical format is recorded in the form of pits on a plastic disk by means of stamping, and with a rewritable RAM area obtained by coating the remainder of the disk with a recording film. If an optical disk is thus made a partial ROM disk, the publication data can be recorded en masse by stamping, thus eliminating the need for performing an electrical writing operation each time. This facilitates the creating of electronic publications on an optical disk and makes provision possible in less time and at lower cost.

Furthermore, the publication data 13a is encrypted and recorded in the second section 13, and the decoding software 12c for restoring the encrypted publication data to its original form is recorded in the first section 12. By virtue of the encrypting operation, the publication data is rendered meaningless if it is copied unlawfully to another recording medium (e.g., a RAM disk or the like). This makes it impossible to read out normal information, thereby preventing unlawful copying. In this case, the data necessary for decoding the encrypted publication data is recorded beforehand in an area that cannot be utilized by the user. The encrypted publication data is decoded using this data. If this expedient is adopted, the original publication data cannot be restored and unlawful copying can be prevented even if the encrypted publication data or decoding software is copied. Further, it is so arranged that data specifying the method of encrypting the publication data is recorded in an area that cannot be utilized by the user, plural items of decoding software are recorded in the first section 12 and decoding is carried out by whichever decoding software, conforms to the data of the encrypting method. As a result, the original publication data cannot be restored and unlawful copying can be prevented even if the encrypted publication data or decoding software is copied.

Further, by arranging so that the data of the electronic publication, the CD-ROM utilization tool, the CD-ROM emulator and the decoding software are recorded on a single optical disk, it is possible to provide an environment in which electronic publications on a single optical disk can be utilized. This enhances convenience of use. It should be noted that it is not always necessary to record the CD-ROM utilization tool and the CD-ROM emulator on the optical disk in advance; these can be stored beforehand in other storing means such as a hard disk.

Further, information in general, which is not limited to electronic publications, is recorded on an optical disk upon being encrypted, and data (a stamper ID) necessary for decoding the encrypted information is recorded by stamping in an area that stores information in the form of pits, thereby constructing an optical disk medium. As a result, even if the information is copied unlawfully, data (the stamper ID) needed to restore the original information cannot be acquired. The copied information is thus meaningless, as a result of which unlawful copying is prevented in an effective manner.

(2) Embodiment
System Configuration

FIG. 3 is an external view illustrating a system that utilizes the electronic publications of a magneto-optical disk according to the present invention. The system includes the magneto-optical disk 11, the magneto-optical disk drive 21, the host system 31 (the main body of a computer), and the data input unit (control panel) 41, which has a keyboard 41a and a mouse 41b. Numeral 51 denotes a display unit such as a CRT or liquid-crystal display, and 61 represents a printer. The magneto-optical disk 11 has a plurality of sections, such as the section (first section) 12 provided in the rewritable RAM area and the section (second section) 13 provided in the ROM area exclusively for playback.

Figure 4:
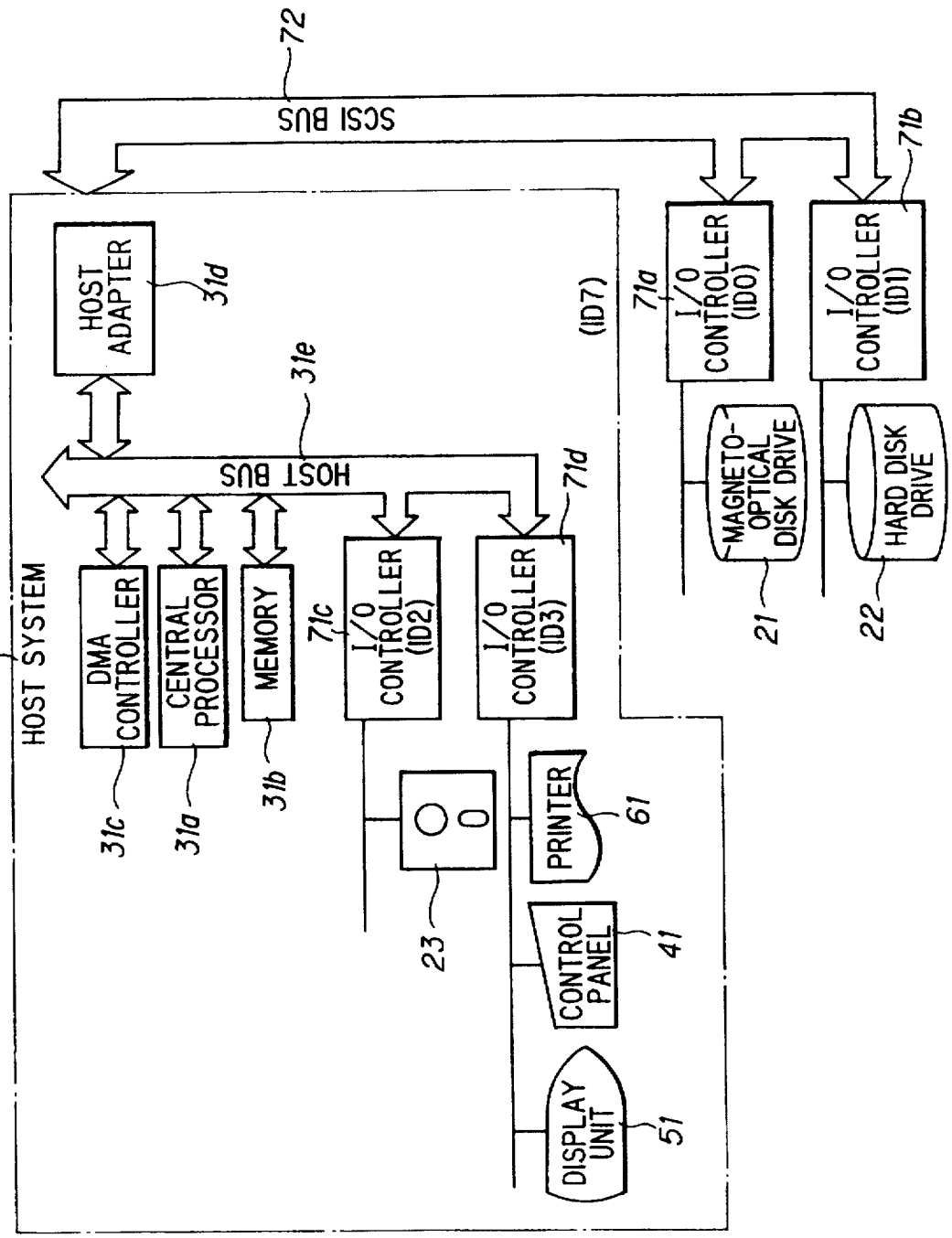
FIG. 4 is a block diagram showing the electrical configuration of the system.

FIG. 4 is a diagram showing the electrical configuration of the system, in which portions identical with those shown in FIG. 3 are designated by like reference characters. Numeral 21 denotes the magneto-optical disk drive, 22 a hard disk drive, 31 the host system, 71a~71b I/O controller and 72 an SCSI (small computer system interface) bus. An SCSI is an interface that connects the main body of a computer with an external storage device. The specifications of an SCSI are stipulated by the American National Standard Institute (ANSI). The SCSI bus 72 is composed of a data bus, which comprises eight bits and a parity bit, and nine control busses, by way of example. Up to a maximum of eight SCSI devices (a host computer, a disk drive controller, etc.) can be connected to the SCSI bus, and each device connected has an identification number, referred to as an "ID" (identifier), of from 0 to 7. In FIG. 4, identifiers ID0-ID1 are allocated to the I/O controllers 71a, 71b, respectively, and ID7 is allocated to the host computer 31. Though the optical disk drive 21 and hard disk drive 22 are connected to the I/O controllers 71a, 71b, more that two drives can be connected.

The host system 31 includes a central processor 31a, a memory 31b, a DMA controller 31c, a host adapter 31d and I/O controllers 71c, 71d, all of which are connected to a host bus 31e. The host system 31 uses a floppy disk drive 23, which is connected to the I/O controller 71c. The host system further includes the control panel 41, the display device 51 and the printer 61, all of which are connected to an I/O controller 71d.

The host system 31 and the I/O controllers 71a, 71b are interconnected by an SCSI interface, and the I/O controllers 71a, 71b are connected to the respective drives 21, 22 by ESDIs (enhanced small device interfaces), by way of example. In this system the magneto-optical disk drive 21 and the hard disk drive 22 are separated from the host bus 31e, the SCSI bus 72 is provided separately of the host bus, the I/O controllers 71a, 71b for the drives are connected to this SCSI bus and the drives 21, 22 are controlled by the I/O controllers 71a, 71b, respectively, to lighten the burden upon the host bus.

Figure 5:
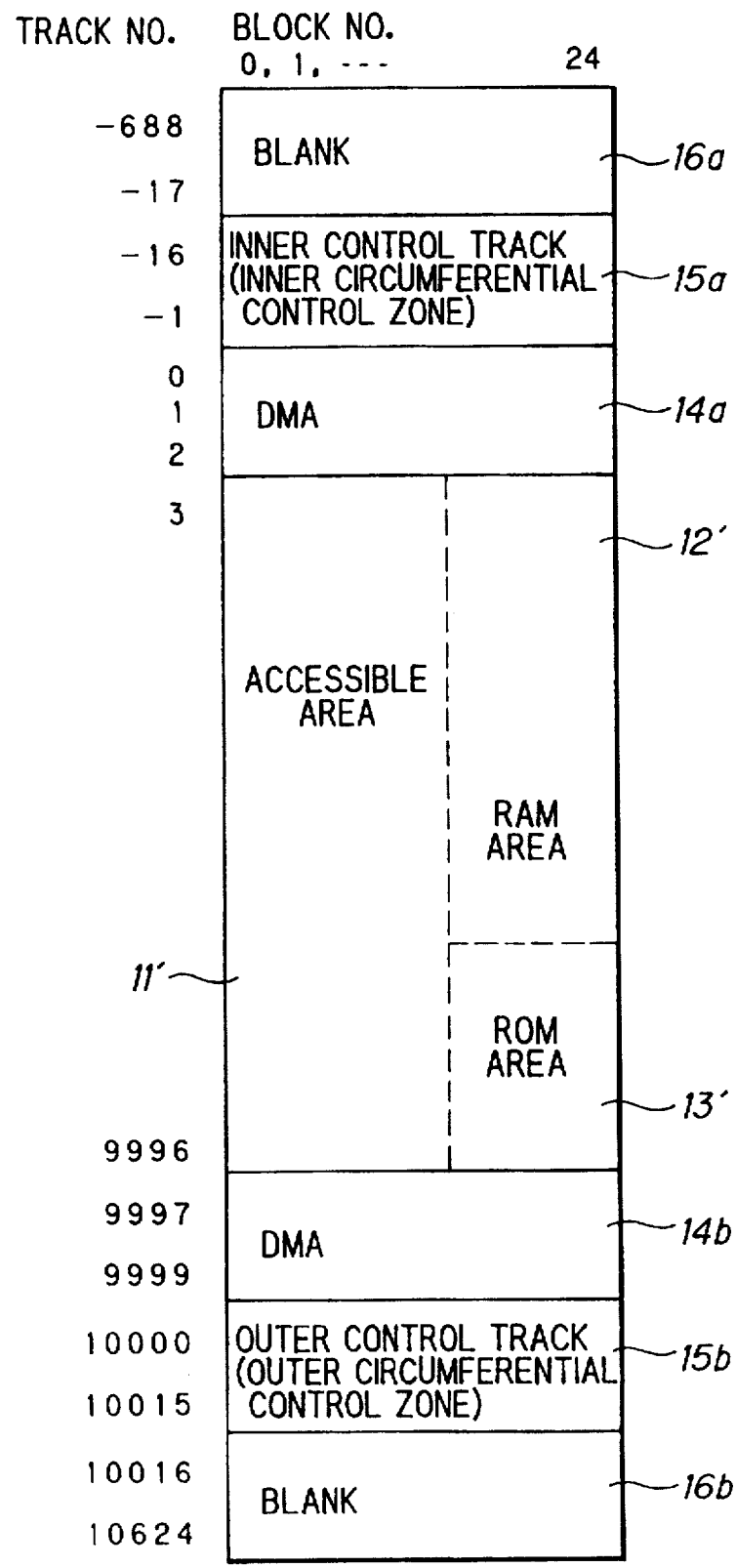
FIG. 5 is a diagram for describing the constitution of an optical disk.

General Constitution of Magneto-optical Disk (a) Overall constitution FIG. 5 is a diagram for describing the constitution of a magneto-optical disk based upon the International Standards Organization (ISO). FIG. 5 is an example relating to a 3.5-inch magneto-optical disk. Block (sector) numbers (0–24) are taken along the horizontal direction, and track numbers are shown along the vertical direction. The area from Track 3 to Track 9996 is an accessible area (user-data zone) 11' capable of being accessed by the user by an ordinary method. The accessible area 11' can be one in which ① the entire area is a RAM portion 12' (full RAM disk), ② the entire area is a ROM portion 13' (full ROM disk) and ③ the inner side is the RAM portion 12' and the outer side is the ROM portion 13' (partial ROM disk). The three tracks in the inner side and the three tracks on the outer side of the accessible area 11' are provided respectively with defect management areas (DMA) 14a, 14b. The inner and outer circumferential portions are provided with an inner control track (referred to as an inner control zone) 15a, an outer control track (referred to as an outer control zone) 15b, and blank areas 16a, 16b. The defect management area DMA is an area for managing error information and substitute sectors, etc., when a defective sector occurs in the accessible area 11'.

(b) Control zones

Data for controlling a disk drive is recorded in the control zones 15a, 15b in the form of pits by means of stamping. Since the control zones consist of pit information, they are recorded by being transferred from the stamper when the disk is manufactured. This means that magneto-optical disks manufactured from the same stamper have the same control zones and that disks manufactured from different stampers have control zones whose contents differ from each other.

The user cannot write information in the control zones 15a, 15b and cannot access these zones freely. Control data (e.g., set conditions relating to recording and reading of data) composed of 512 bytes (=one block) is repeatedly recorded in the control zones 15a, 15b. The magneto-optical disk drive 21 reads out the control data in the control zones 15a, 15b of the magneto-optical disk and, in accordance with the control data, sets conditions for recording and reading out information. For example, on the basis of control data that has been read, the magneto-optical disk drive 21 performs the writing of data upon making the writing power 7.0 mW when the rotational speed is 188 rpm. Of the 512 bytes in the control zones 15a, 15b, a combination of several bytes is adopted as data (referred to as the "stamper ID") necessary for decoding encrypted information.

(c) Accessible area

Figure 6:
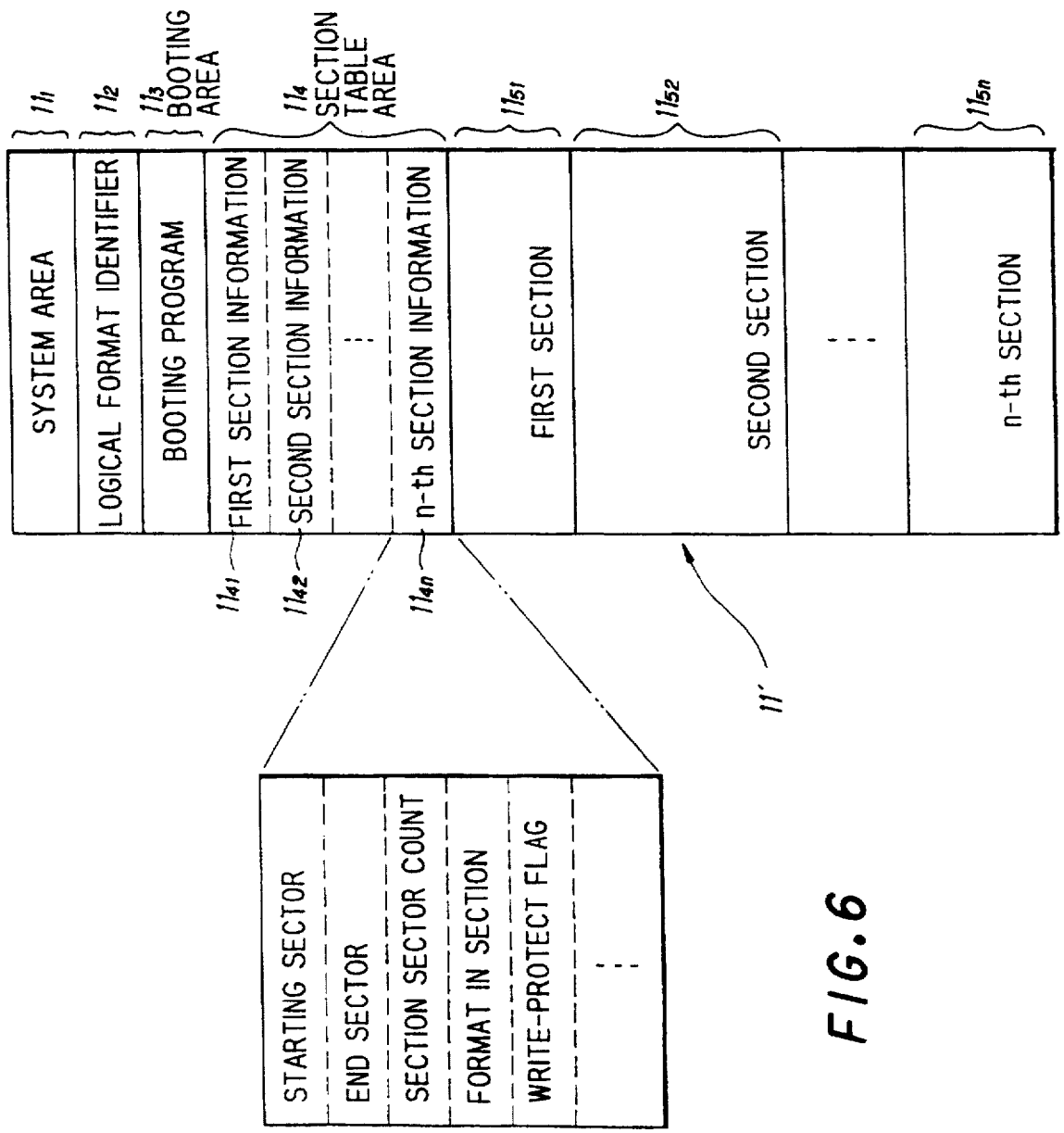
FIG. 6 is a diagram showing the constitution of an accessible area.

If the accessible area 11' is in accordance with the ECMA 167 (ISO-DIS 13356) format, it is provided with various areas, as shown in FIG. 6. Specifically, the accessible area 11' is provided with ① a system area $11_1$ from sector 0 to sector 63 thereof, ② a logical-format identifier area $11_2$ in sector 64, ③ a booting area $11_3$ from sectors 65 to 256, ④ a section table area $11_4$ from sector 257 to a prescribed sector, and ⑤ n-number of section areas (first through n-th sections) $11_{S1}$~$11_{Sn}$ from the area $11_4$ onward.

The system area $11_1$ is an area that takes into consideration the compatibility between ECMA 167 and an existing hard disk system, CD-ROM and CD-WO (CD-write once). The logical-format identifier area $11_2$ is an area for recording the identifier of the logical format (MS-DOS, UNIX, etc.) of the media. The boot area $11_3$ stores identification information representing the maker or machine type, as well as a booting program (multiple-booting) for each machine type. The section table area $11_4$ is an area in which information (section information) of each area is written. FIG. 6 illustrates a case in which the section table area $11_4$ is subdivided into n-number of sections (first through n-th sections). First through n-th items of section information $11_{41}$~$11_{4n}$ are written in the section table area $11_4$. Recorded in each of the items of section information $11_{41}$~$11_{4n}$ are ① a starting sector of a section, ② the end sector of the section, ③ the sector count of the section, ④ the format (e.g., DOS, UNIX, CD-ROM logical format, etc.) within the section, ⑤ a write-protect flag indicating whether rewriting is forbidden or not, and ⑥ attribute information, such as the type of secrecy protection, representing what type of secrecy protection is in effect.

(d) Sections

Figure 7:
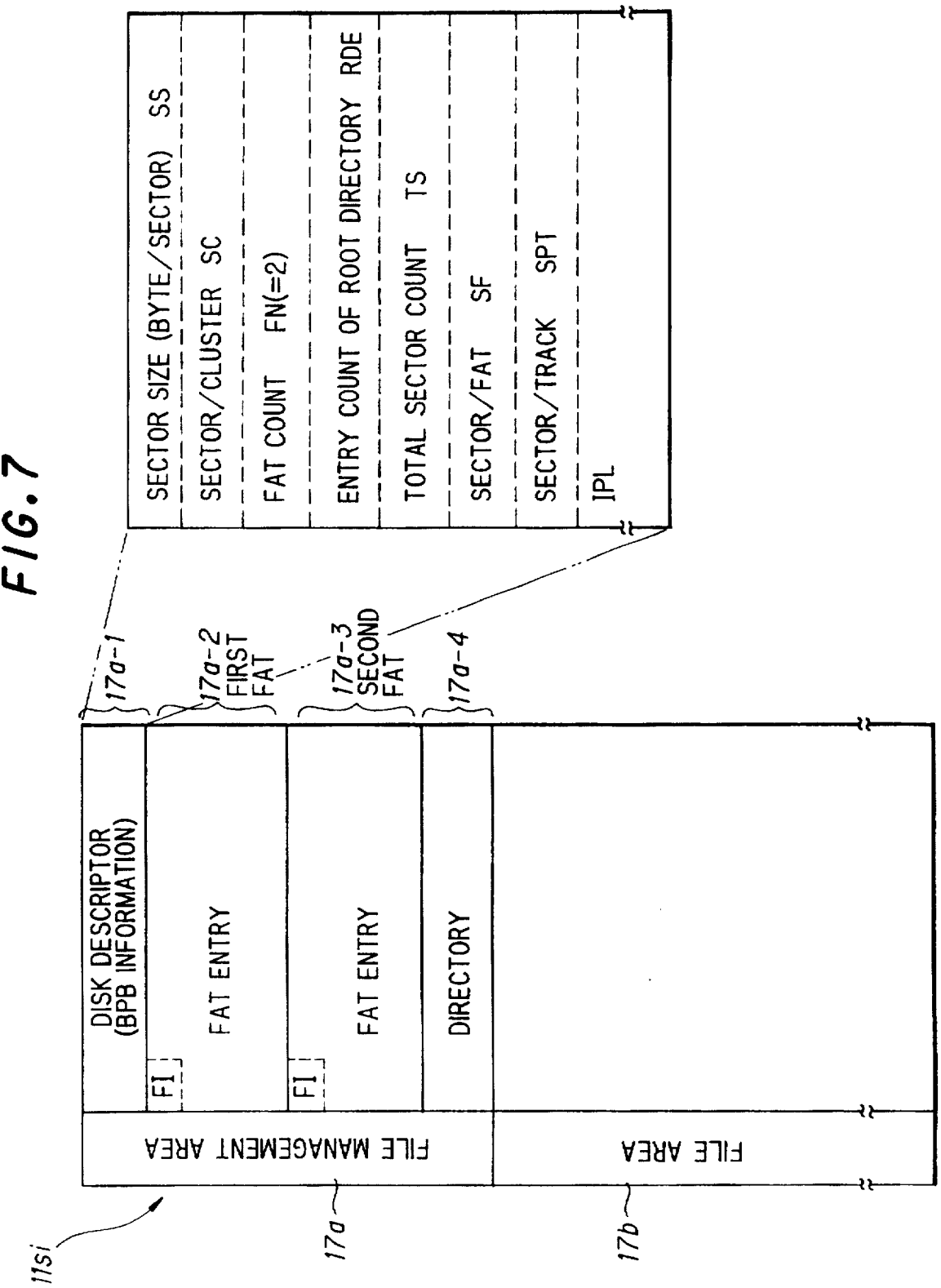
FIG. 7 is a diagram for describing the structure of a section.

DOS sections will now be described by way of example. As shown in FIG. 7, each of the section areas $11_{S1}$~$11_{Sn}$ is provided with a file management area storing file management information and a file area storing files. Numeral $11_{5i}$ denotes a section, 17a a file management area and 17b a file area. The following is stored in the file management area 17a: a booting sector (a disk descriptor, IPL, etc.) 17a-1; redundant first and second file allocation tables (file allocation tables, abbreviated to "FAT") 17a-2, 17a-3; and a directory 17a-4 designating the first cluster number of each file.

The disk descriptor (BIOS parameter block information, or BPB information) of the booting sector 17a-1 describes the volume structure parameters of the disk, namely sector size (number of bytes per sector) SS, count SC of sectors (blocks) per cluster, count FN (=2) of FATs, count RDE of entries in a root directory, total count TS of sectors, count SF of sectors per FAT, and count SPT of sectors per track. IPL starts the operating system (OS) of the section.

The FATs 17a-2, 17a-3 are each constituted by a format identifier (FI) and a FAT entry portion (FAT entries). The FAT entry portion has FAT entries the number of which is equivalent to the number of clusters in the section. The FAT entries take on values of 0000, 0002~MAX, FFF7, FFFF, respectively, in which 0000 means that the cluster is not in use. Further, 0002~MAX mean that the cluster is in use, with the next storage location of a file being designated by the particular value. Further, FFF7 means that there is a defect in the sector constituting the cluster, and FFFF signifies end of file.

Each directory entry (32 bytes) in the directory 17a-4 has a space for a file name, a space for a file name extension, a space for an attribute indication, a space for a reserved field, a space for file modification time, a space for a file modification date, a space for a starting cluster number of a file, and a space for file length.

(e) System Start-Up

The method of volume management of a magneto-optical disk differs depending upon the system; when an interchangeable magneto-optical disk is divided into a plurality of sections, compatibility is lost. Accordingly, the aforementioned ECMA-167 (ISO-DIS 13356) format has been supported by Subcommittee SC15 of the ISO as the standard of a format for data interchange. According to the ECMA-167 (ISO-DIS 13356) format, a plurality of different systems (e.g., PC-9800, Macintosh, UNIX, etc.) can be started up on one disk. More specifically, a starting program (IPL) of a prescribed system scans the booting area $11_3$ (FIG. 6), finds the booting program that is suited to its own machine type and loads this booting program in the main memory of the system. As a result, control shifts from the starting program to the booting program that has been loaded. The booting program examines the section table area $11_4$ and finds a section capable of being started (namely a section whose format is identical to its own). The booting sector 17a-1 of this section is read in the main memory and control shifts to the IPL of this booting sector. The IPL of the booting sector loads the OS (MS-DOS, etc.) of this section in the main memory and starts the OS.

Constitution of Magneto-optical Disk of the Invention (a) Overall construction

Figure 8:
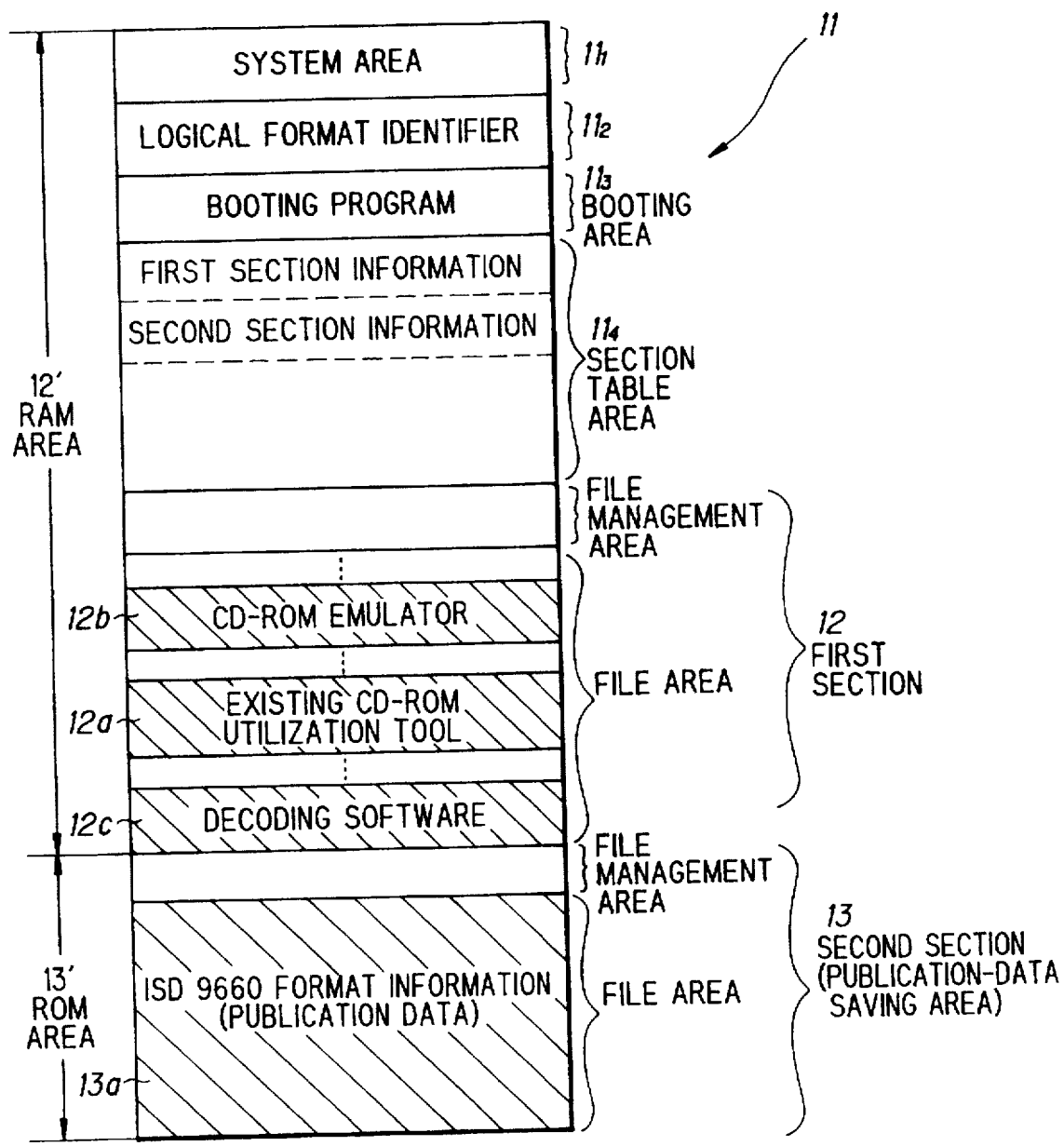
FIG. 8 is a diagram for describing information recorded on a magneto-optical disk medium according to the present invention.

FIG. 8 is a diagram for describing information recorded on a magneto-optical disk medium according to the present invention. Numeral 11 denotes the magneto-optical disk medium, which has the constitution of a partial ROM and is equipped with a writable RAM area 12' and a ROM area 13' in which recording data is recorded by stamping in the form of pits. The magneto-optical disk medium 11 has a volume structure in which the RAM and ROM areas each have one section. This is accordance with ECMA-167 (ISO-DIS 13356). The present invention is not limited to a partial ROM disk but is applicable also to a magneto-optical disk having more than two sections.

The RAM area 12' has the system area $11_1$, the logical-format identifier area $11_2$, the booting area $11_3$ and the section table area $11_4$. Numeral 12 denotes the first section. In the ROM area 13', numeral 13 denotes the second section (the area for saving the publication data).

The first section 12 is formatted according to ISO 9293 (MS-DOS). The existing CD-ROM utilization tool 12a, CD-ROM emulator 12b and decoding software (deencrypting software) 12c are recorded in this section.

The publication data 13a in accordance with the ISO 9660 format (the CD-ROM logical format) is encrypted and recorded in the second section 13 beforehand in the form of pits by means of stamping.

The existing CD-ROM utilization tool 12a is software that utilizes existing publication data having the ISO 9660 format. The CD-ROM emulator 12b is software for converting a CD-ROM access request (a read command, etc.) issued by the existing CD-ROM utilization tool to an magneto-optical-disk access request. The decoding software 12c is software for restoring the publication data 13a, which has been encrypted and recorded, to its original form.

The existing CD-ROM utilization tool 12a, the CD-ROM emulator 12b and the decoding software 12c may be recorded in any order and at any desired positions; it will suffice if these are capable of being recognized as files according to ISO 9293. The publication data 13a in accordance with the ISO 9660 format may be encrypted and recorded in the first section 12, and the second section 13 may have the ISO 9293 format. Furthermore, after the publication data is encrypted, it can be recorded in the second section in accordance with the ISO 9660 format. Though the publication data 13a has been recorded in the ROM area of the partial ROM disk in the form of pits by stamping, the publication data can be recorded in a rewritable area electrically using a full RAM disk.

(b) Second section (area for saving publication data)

Figure 9A:
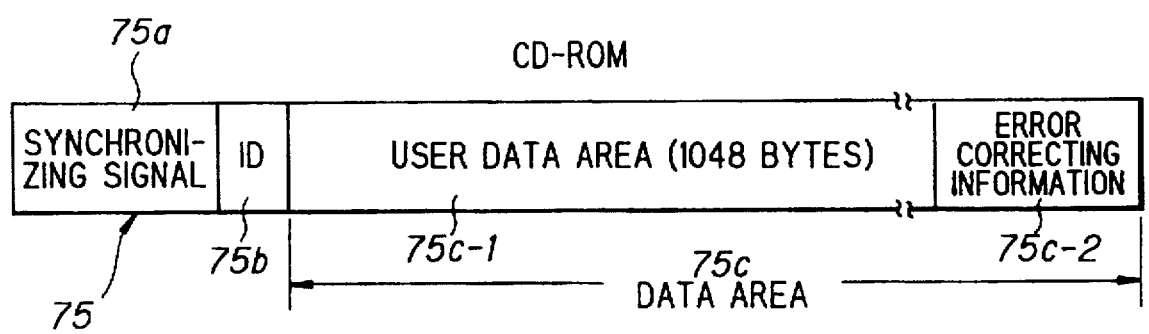
FIG. 9A is a diagram for describing a data block format in a CD-ROM.
Figure 9B:
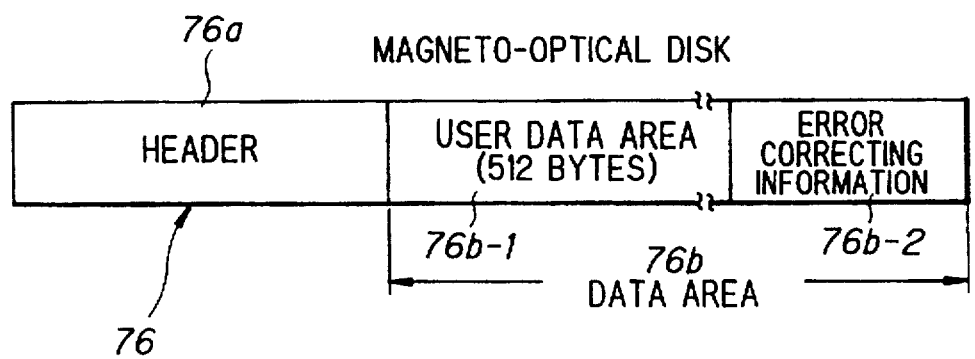
FIG. 9B is a diagram for describing a data block format in a magneto-optical disk.

FIGS. 9A, 9B are for describing the physical format of a data block (also referred to as a sector) in a CD-ROM and in a magneto-optical disk, respectively. FIG. 9A shows the physical format of a data block in a CD-ROM, and FIG. 9B shows the physical format of a data block in a 3.5-inch magneto-optical disk decided in accordance with ISO specifications.

In FIG. 9A, numeral 75 denotes one data block of a CD-ROM. The data block 75 has a synchronizing signal area 75a, an ID area 75b and a data area 75c. A synchronizing signal for correctly reproducing continuous data is recorded in the synchronizing signal area 75a. Information (address information) indicating the position of the data block is recorded in the ID area 75b. The data area 75c is composed of a user data area 75c-1 of 2048 bytes and an error-correction information area 75c-2, of 288 bytes, for error detection and correction.

In FIG. 9B, numeral 76 denotes one data block of a magneto-optical disk. The data block 76 has a header area 76a and a data area 76b. A synchronizing signal and an ID (address information), which indicates the position of the data block, are recorded in the header 76a. The data area 76b is composed of a user data area 76b-1 of 512 bytes and an error-correction information area 76b-2.

It should be noted that the data length of one block of the CD-ROM is 2048 bytes, which is four times the data length of the magneto-optical disk. Accordingly, one block of data (2048 bytes) of the CD-ROM can be divided into four portions of 512 bytes each and recorded in four blocks of the magneto-optical disk.

Figure 10:
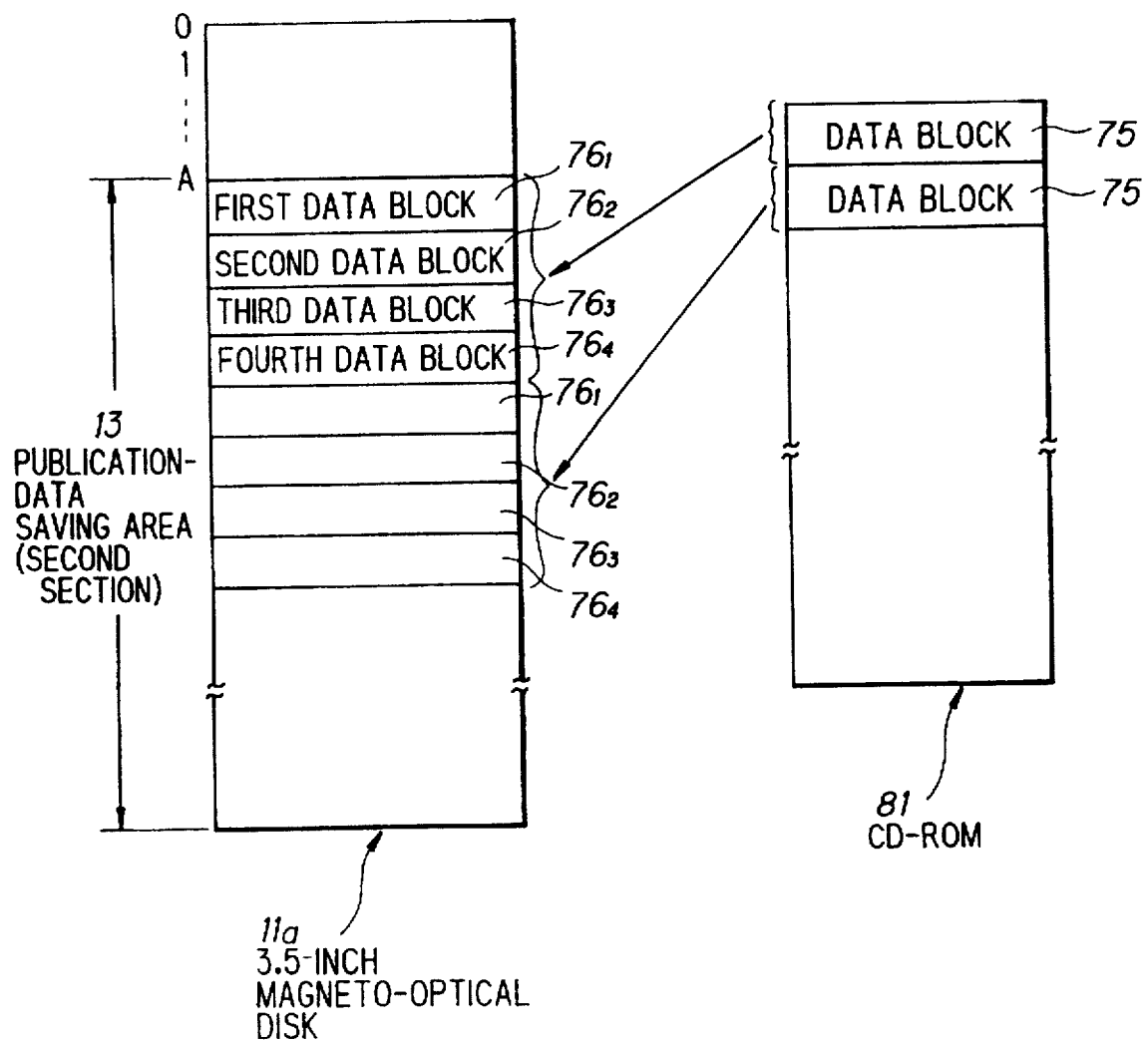
FIG. 10 is a diagram for describing a case in which publication data is saved on a magneto-optical disk.

FIG. 10 is a diagram for describing a case in which data is saved in the publication-data save area (the second section) of a 3.5-inch magneto-optical disk. Numeral 11a denotes the 3.5-inch magneto-optical disk, which carries the area (second section) 13 for saving publication data. Numeral 81 denotes a CD-ROM. As mentioned above, the user data area of one data block of the CD-ROM 81 has 2048 bytes, and the user data area of one data block of the 3.5-inch magneto-optical disk 11a has 512 bytes. Accordingly, the user data in the one data block 75 of the CD-ROM 81 is divided into four portions, which are recorded in respective ones of four data blocks $76_1 \sim 76_4$ of the 3.5-inch magneto-optical disk 11a. In similar fashion, the user data of each data block of the CD-ROM 81 is divided into four portions, which are then recorded in respective ones of four data blocks of the 3.5-inch magneto-optical disk 11a. In this case, the data block numbers of the four data blocks on the 3.5-inch magneto-optical disk 11a that record data identical with the data of an x-th data block of the CD-ROM 81 are as follows, where A represents the first block number of the publication-data saving area 13:

A+4·x, A+(4·x+1), A+(4·x+2), A+(4·x+3)

The symbol "·" signifies multiplication.

Figure 11:
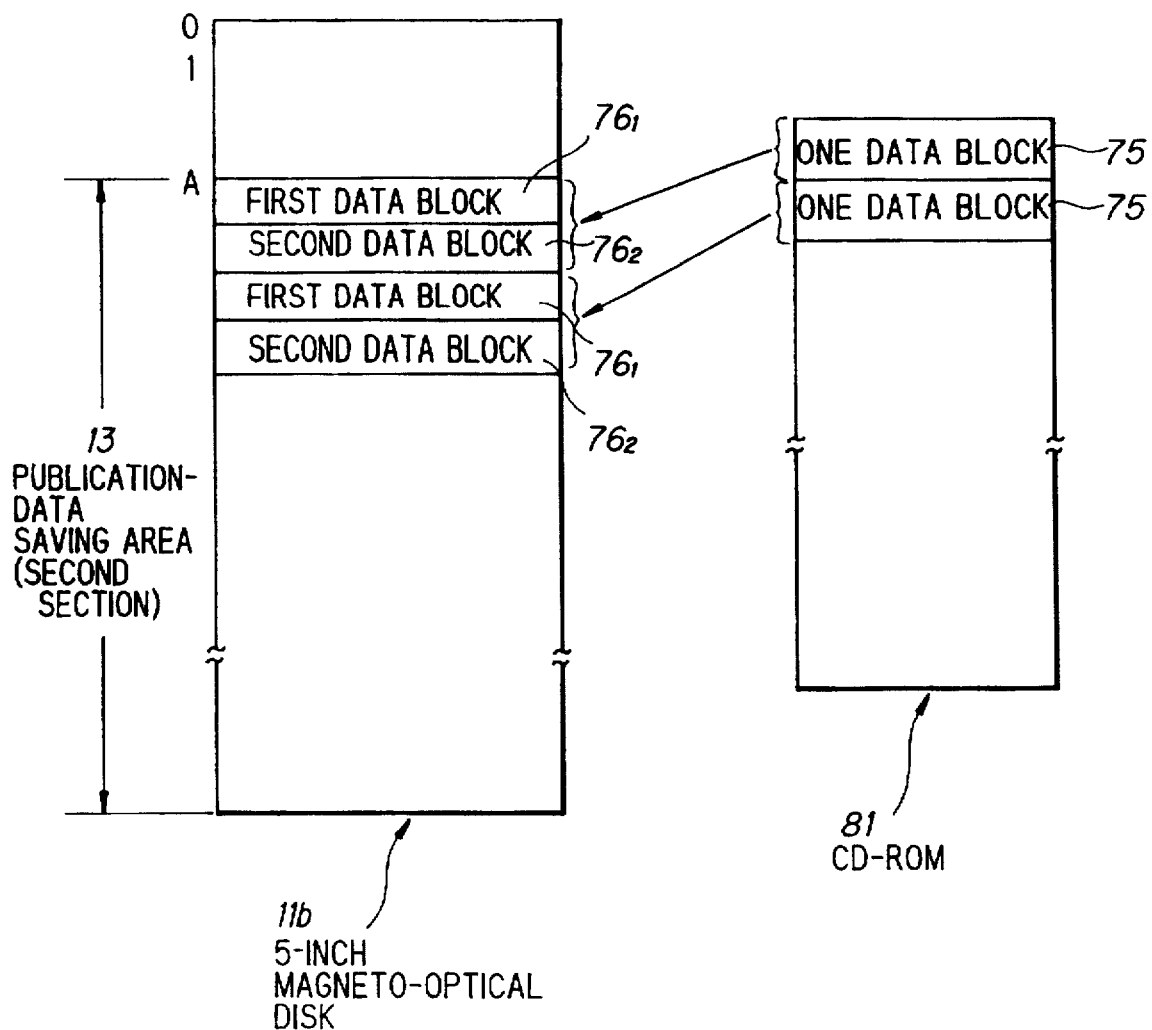
FIG. 11 is another diagram for describing a case in which publication data is saved on a magneto-optical disk.

FIG. 11 is a diagram for describing a case in which data is saved in a publication-data saving area of a 5-inch magneto-optical disk. Numeral 11b denotes the 5-inch magneto-optical disk, on which the size of the user data area of one data block is 512 or 1024 bytes. According to the ISO specifications, the user data area of a 5-inch magneto-optical disk is set at 512 bytes and 1024 bytes. In case of a disk having a data area of 1024 bytes, the user data of one data block 75 of the CD-ROM 81 is divided into two portions, which are recorded in respective ones of two data blocks $76_1$, $76_2$ of the 5-inch magneto-optical disk 11b. In this case, the data block numbers of the two data blocks on the 5-inch magneto-optical disk 11b that record data identical with the data of an x-th data block of the CD-ROM 81 are as follows, where A represents the first block number of the publication-data saving area 13:

A+2·x, A+(2·x+1)

(c) Encrypting of publication data

① First embodiment of coding

Figure 12:
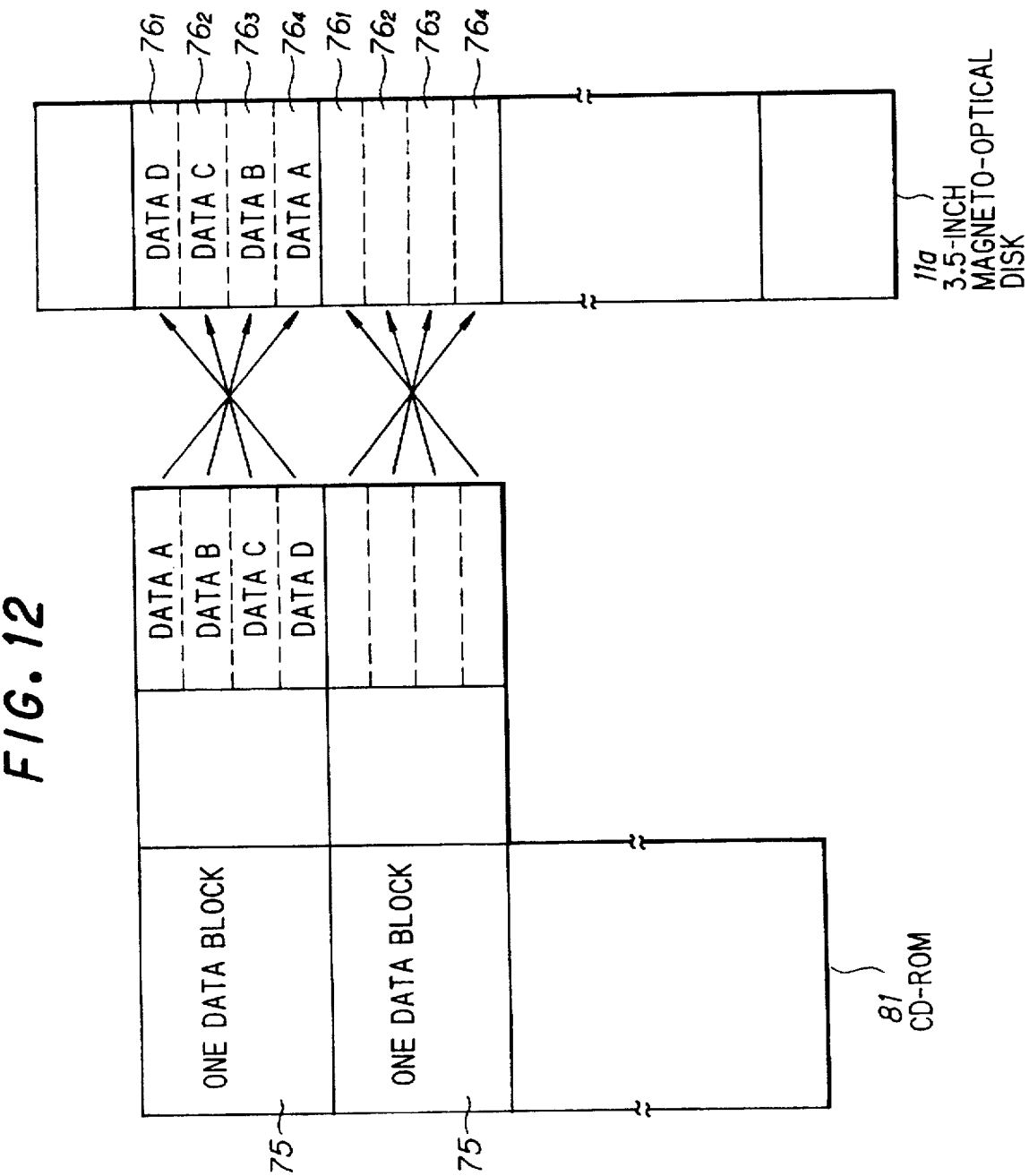
FIG. 12 is a diagram for describing processing for encrypting publication data.

FIG. 12 is a diagram for describing processing for encrypting publication data. Numeral 11a denotes the 3.5-inch magneto-optical disk, and number 81 designates the CD-ROM. Data A~Data D are items of data obtained by dividing one block of data on the CD-ROM into four portions each consisting of 512 bytes. The symbols A, B, C, D are assigned in order starting from the beginning of the data. In a case where encrypting is not performed, the data is recorded in four blocks $76_1$, $76_2$, $76_3$, $76_4$ of the magneto-optical disk 11a in the order of the data A, B, C, D. If encrypting is performed, however, the data is stored in the blocks $76_1$, $76_2$, $76_3$, $76_4$ in an order which is the reverse of the recording sequence of the data A, B, C, D. This means that if the order in which the data was recorded is not known on the user side, the publication data cannot be rearranged correctly on the user side even if it is copied unlawfully. This makes it possible to protect the data as well as any copyright involved. It should be noted that the rearrangement of the data A~data D at the time of recording is not limited to the reverse order. Rearrangement can take on any order, such as data C→data A→data D→data B. Further, the reshuffling of data is not limited to four items data A~data D; the reshuffling can take place among 4·m items of data.

② Second embodiment of coding

Figure 13:
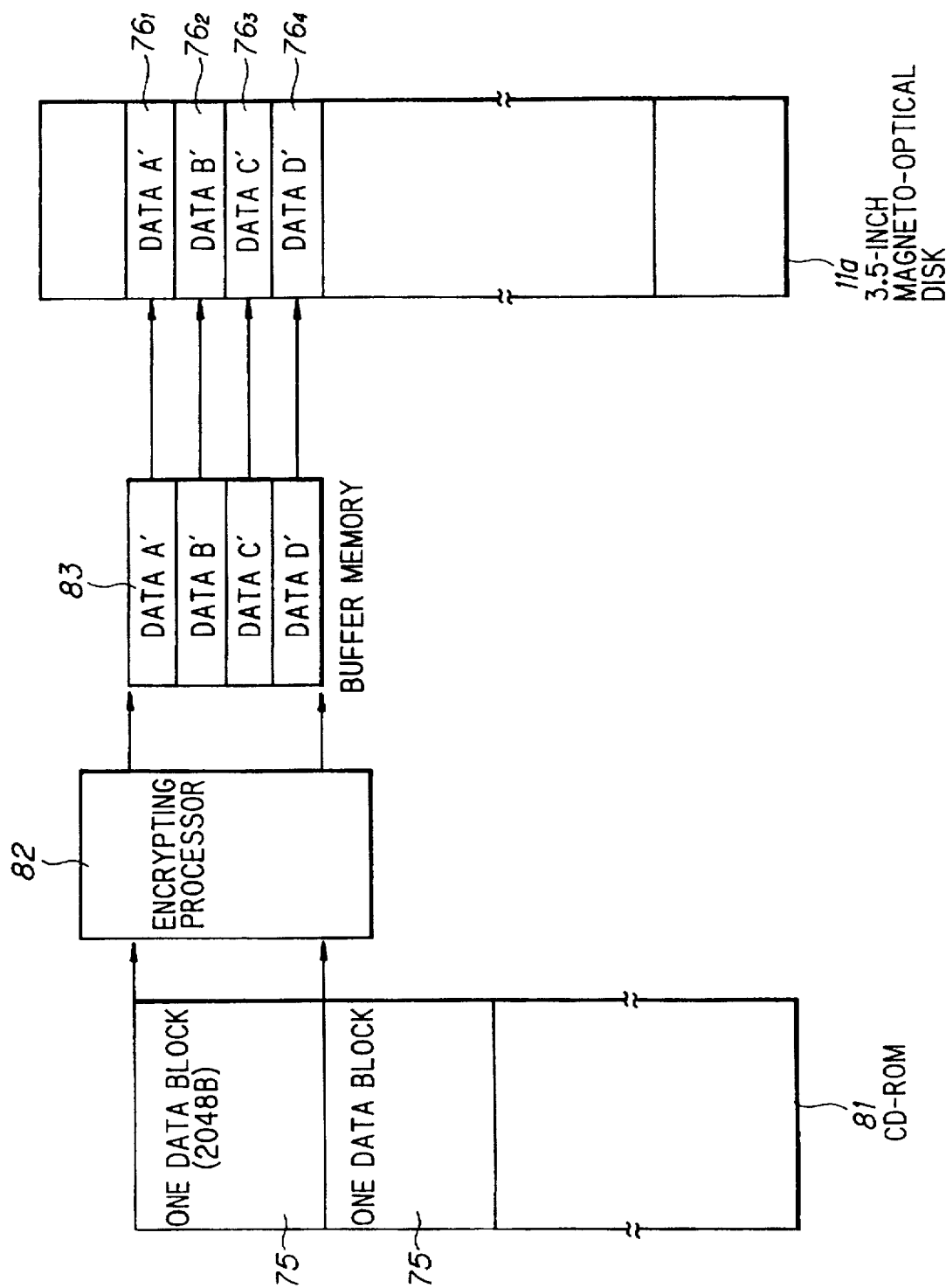
FIG. 13 is a diagram for describing another embodiment of processing for encrypting publication data.

FIG. 13 is a diagram for describing different processing for encrypting publication data. Numeral 11a denotes the 3.5-inch magneto-optical disk, number 81 the CD-ROM, 82 an encrypting processor and 83 a buffer memory. The encrypting processor 82 applies prescribed encrypting processing to the user data of 2048 bytes in the CD-ROM. The encrypted data of 2048 bytes is divided into four items of data A'~data D' of 512 bytes each, which are recorded in four blocks $76_1$, $76_2$, $76_3$, $76_4$ of the magneto-optical disk 11a in the order mentioned. By way of example, the encrypting processing involves performing encrypting by taking the exclusive-OR with a constant value C (one byte of data) byte by byte. In order to decode the encrypted data, it will suffice to take the exclusive-OR with the aforesaid constant value C (one byte of data) byte by byte. If this expedient is adopted, encrypted publication data cannot be decoded correctly on the user side, even if the data is copied unlawfully, since the encrypting method is not known to the user side. This makes it possible to protect the data as well as any copyright involved.

The data A'~data D' can be recorded on the 3.5-inch magneto-optical disk 11a even if the order to the data A'~data D' is changed. This will be even more effective in making it possible to prevent unlawful utilization by copying publication data.

Figure 14:
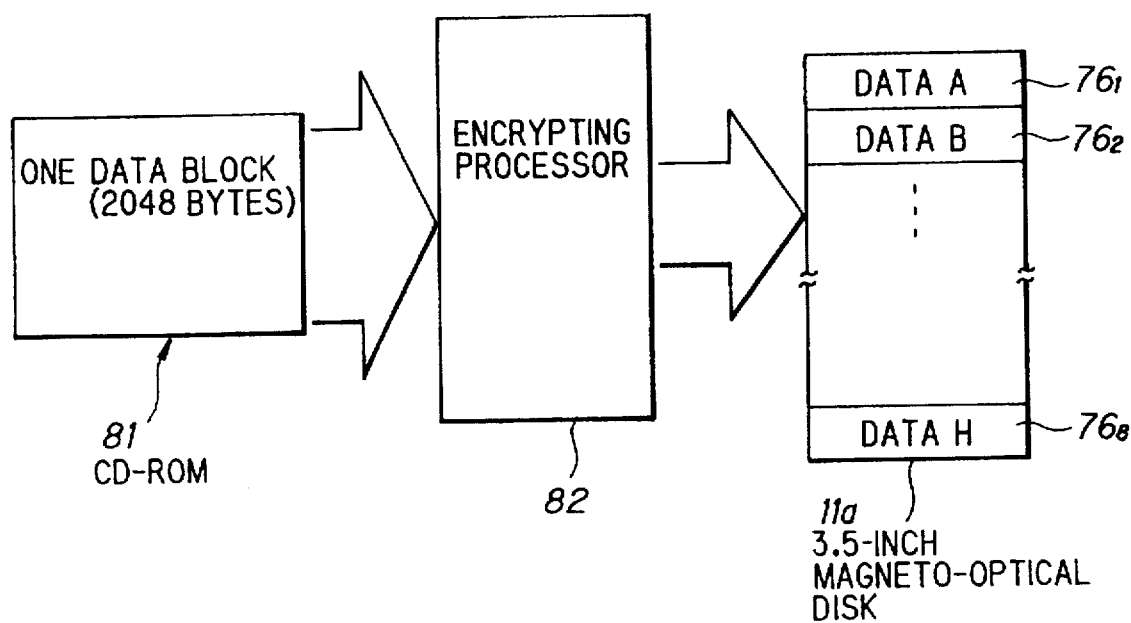
FIG. 14 is still another embodiment of processing for encrypting publication data.

Though the data that has been subjected to encrypting processing in FIG. 13 is composed of 2048 bytes, the encrypted data need not necessarily consist of 2048 bytes. FIG. 14 is a diagram for describing such a case. This is an example in which the encrypted data has a data length of 2×2048 bytes. The encrypted data which is obtained by encrypting processing is divided into eight items of 512-byte data A~H. The eight items of data are recorded in blocks $76_1 \sim 76_8$, respectively, of the magneto-optical disk.

(d) Decoding software

The decoding software 12c is for restoring the encrypted publication data to the original publication data.

① First embodiment of decoding software

Figure 15A:
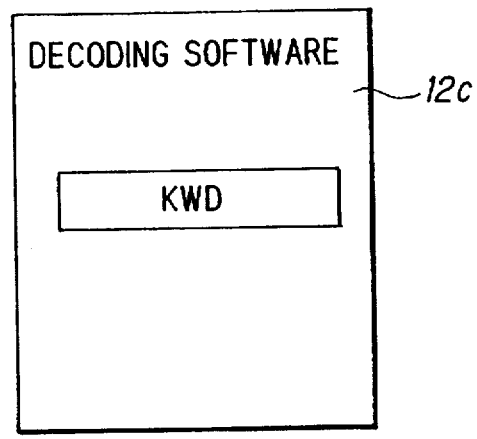
FIGS. 15A, 15B and 15C are diagrams for describing decoding software.

FIG. 15A shows the simplest embodiment of the decoding software 12c. In this embodiment, a keyword KWD necessary to decode the encrypted publication data is provided in the decoding software 12c.

For example, in order to decode publication data encrypted in accordance with FIG. 12, the order of rearrangement necessary for decoding the original publication data is set in the software 12c as the keyword KWD. Further, in order to decode publication data encrypted in accordance with FIG. 13, the above-mentioned constant value C necessary for decoding the original publication data is set in the software 12c as the keyword KWD.

② Second embodiment of decoding software

Figure 15B:
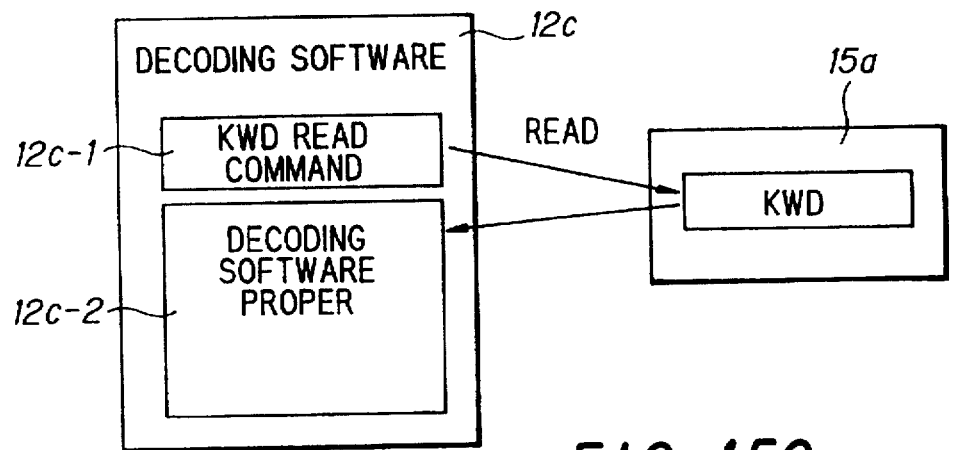

FIG. 15B shows another embodiment of decoding software. In this embodiment, (1) the keyword KWD, which is necessary for decoding the encrypted publication data, is stored, separate from the decoding software 12c, in an area not freely accessible by the user, e.g., in the control zone 15a (see FIG. 5) of the disk; (2) a command 12c-1 for reading the keyword of the decoding software 12c causes the keyword KWD to be read out; and (3) decoding processing is executed by decoding software 12c-2 per se.

In the second embodiment, a combination of several bytes of the 512 bytes of the control zones 15a, 15b is made to serve as the keyword KWD needed to decode the encrypted publication data. In actuality, the control zone information is pit information. This information is recorded by stamping at the time of disk manufacture and differs for every stamper. This keyword KWD shall be referred to as a stamper ID hereinafter.

Figure 16:
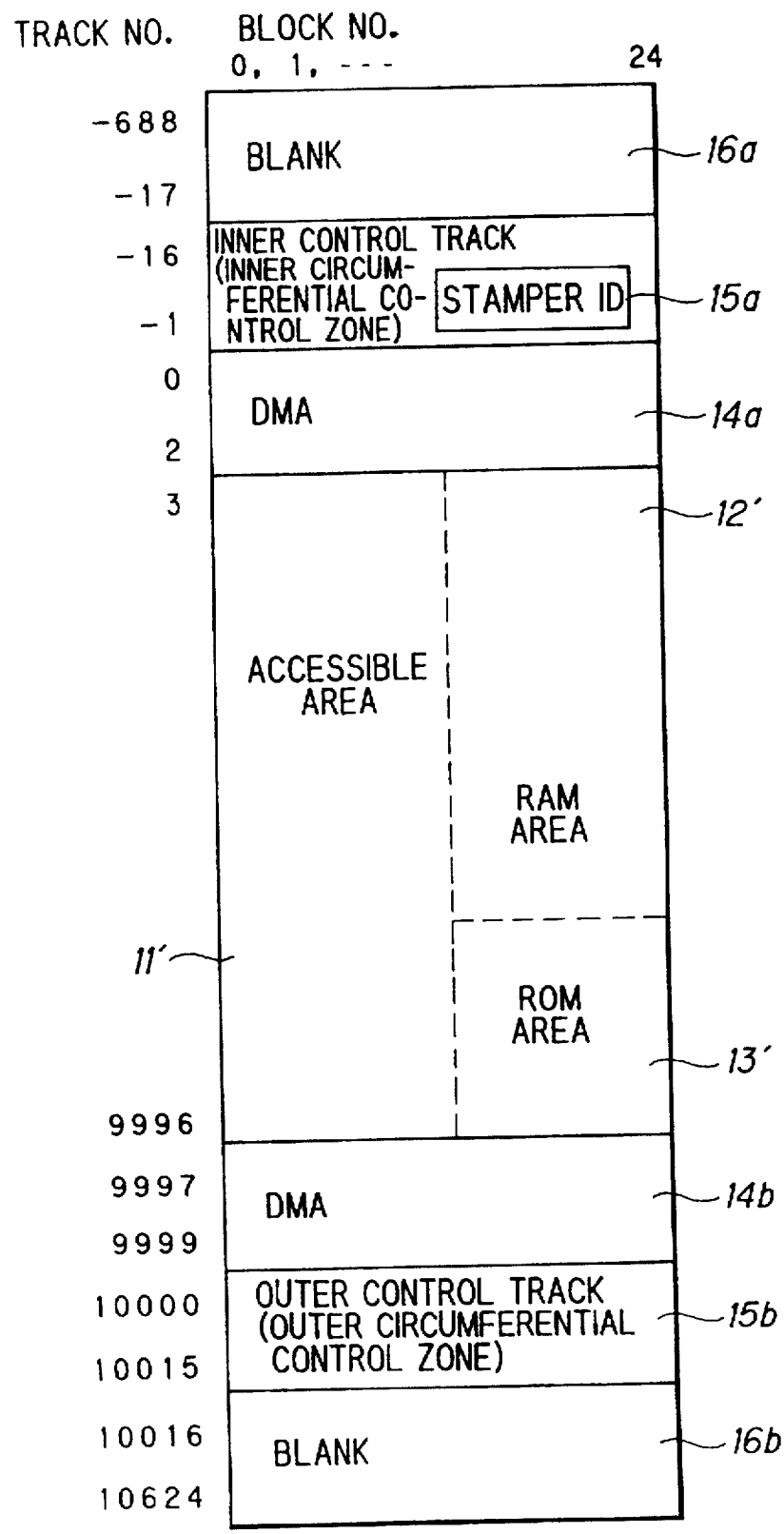
FIG. 16 is a diagram for describing a case in which a stamper ID is recorded in a control zone.

FIG. 16 shows an example in which the stamper ID is recorded in the control zone 15a on the inner circumference, and FIG. 17 shows an example in which a stamper ID $(0124FF32)_H$ is placed in a 10th byte, 25th byte, 200th byte and 490th byte of a prescribed block in the control zone 15a on the inner circumference. Here the subscript H signifies a hexadecimal value. By changing the stamper ID for every stamper, the stamper ID of the magneto-optical disk on which publication data has been recorded and the stamper ID of a disk to which the publication data has been copied can be made to differ. As a result, even if the decoding software is copied unlawfully (the stamper ID cannot be copied), together with the publication data, from an electronic publication on a magneto-optical disk, the stamper ID necessary for decoding will be different. Consequently, the original publication data cannot be decoded and the publication data is protected.

③ Third embodiment of decoding software

Figure 15C:
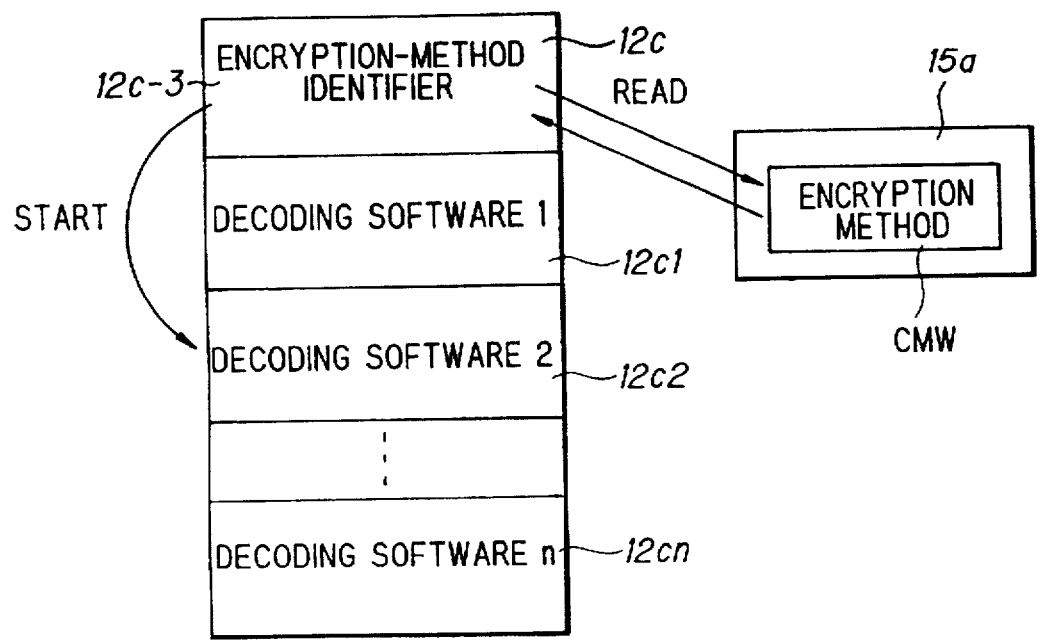

FIG. 15C shows another embodiment of decoding software. In this embodiment, (1) the data CMW that specifies the encryption method is stored in an area not freely accessible by the user, e.g., in the control zone 15a of the disk; (2) an encryption-method identifier 12c-3 reads out the data CMW and identifies the encryption method; and (3) decoding processing is executed by subsequently starting decoding software $12c_1 \sim 12c_n$ conforming to the encryption method.

By virtue of this arrangement is adopted, the data CMW specifying the encryption method necessary for decoding cannot be copied even if the decoding software is copied unlawfully along with the publication data from an electronic publication on a magneto-optical disk. As a consequence, which decoding software is used for decoding is unknown and the original publication software cannot be restored. This assures that the publication data will be protected.

The decoding software 12c of any of the first through third embodiments is written in the first section 12 of the magneto-optical disk 11 of FIG. 8.

(e) Existing CD-ROM tool

Figure 18:
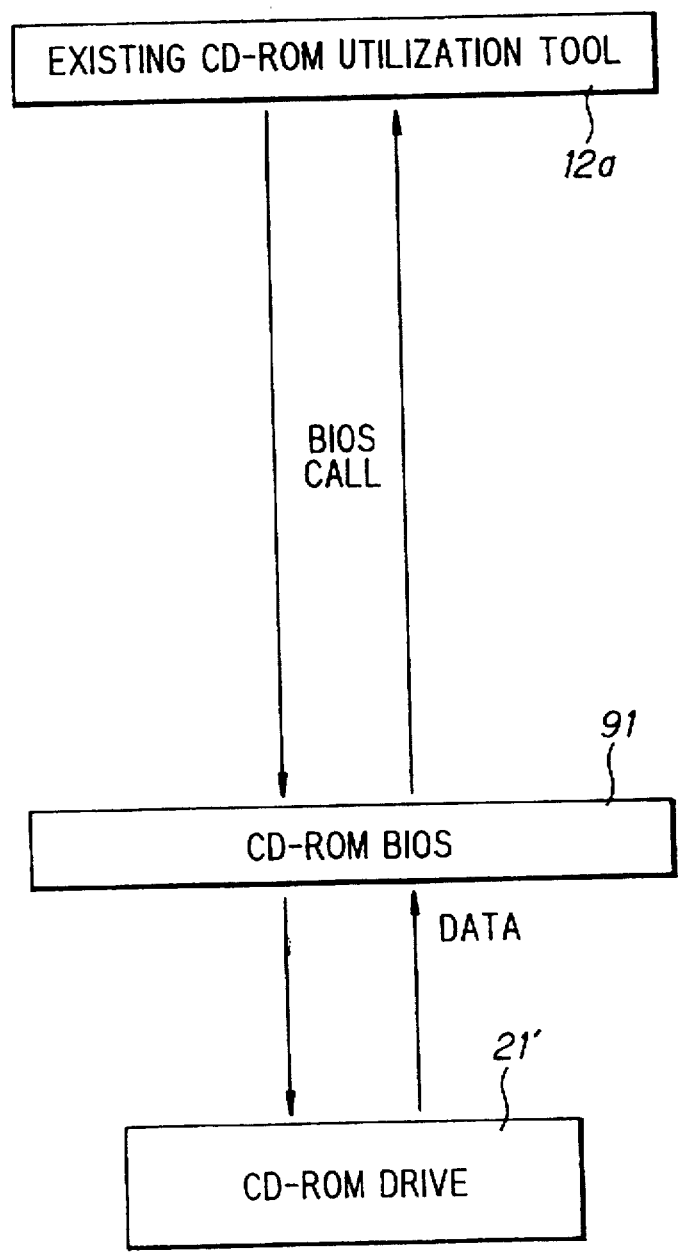
FIG. 18 is a diagram for describing operation in a case where a CD-ROM drive is used in an MS-DOS system.

FIG. 18 is a diagram for describing operation in a case where use is made of a CD-ROM drive running on MS-DOS. Numeral 12a denotes the CD-ROM utilization tool (software), 21' the CD-ROM drive and 91 a CD-ROM BIOS. The CD-ROM utilization tool 12a is for gaining access to the CD-ROM drive 21' for such purpose as reading data, etc. The tool 12a issues a BIOS call to the CD-ROM BIOS 91. The CD-ROM BIOS 91, which makes it possible to utilize the CD-ROM drive 21', analyzes the BIOS call issued by the CD-ROM utilization tool 12a, controls the CD-ROM drive 21' and reads data out of the CD-ROM.

The existing CD-ROM utilization tool 12a that utilizes a CD-ROM electronic publication is written in the first section 12 of the magneto-optical disk 11 shown in FIG. 8.

(f) CD-ROM emulator

① Function and placing of CD-ROM emulator

Figure 19:
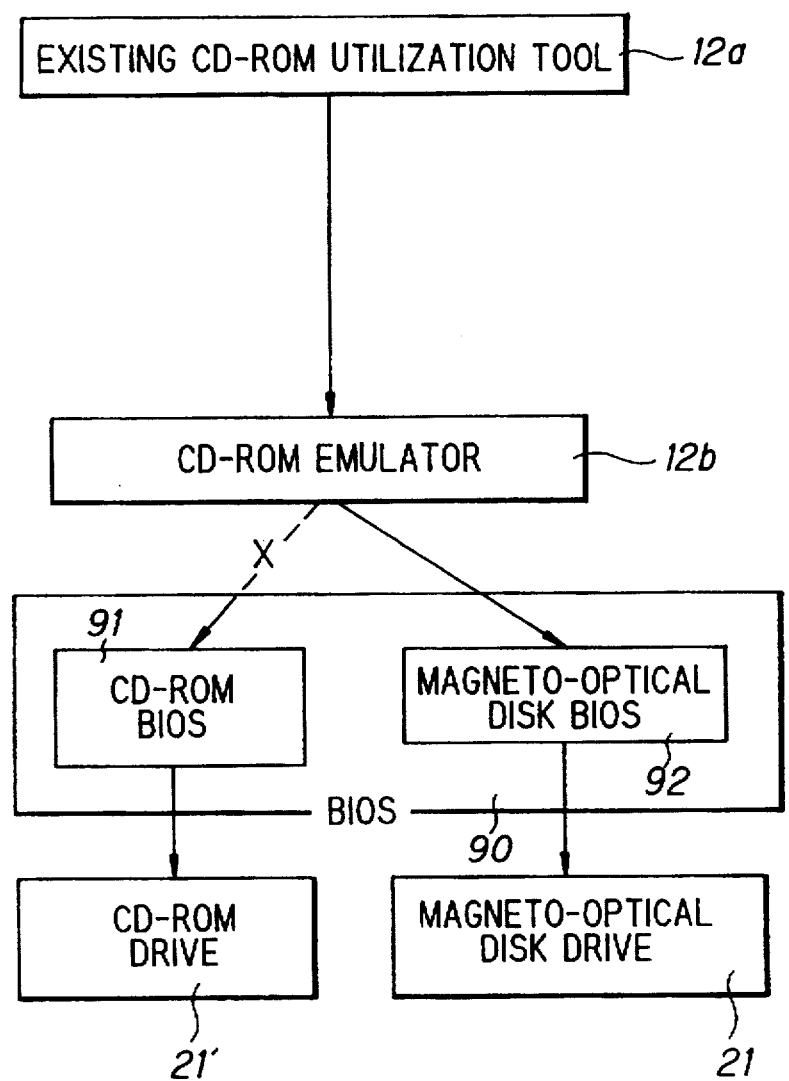
FIG. 19 is a diagram for describing operation of a CD-ROM emulator.

FIG. 19 is a diagram for describing the operation of the CD-ROM emulator 12b operating in MS-DOS. Numeral 12a denotes the existing CD-ROM utilization tool, 12b the CD-ROM emulator, 21' the CD-ROM drive, 21 the magneto-optical disk drive and 90 a BIOS, in which 91 denotes the CD-ROM BIOS and numeral 92 the BIOS of the magneto-optical disk. The CD-ROM emulator 12b changes an access request for access to the CD-ROM drive 21' to an access request for access to the magneto-optical disk drive 21. The BIOS 92 of the magneto-optical disk is a system in MS-DOS and makes it possible to utilize the magneto-optical disk.

The existing CD-ROM utilization tool is 12a a tool effective only in the CD-ROM drive 21' and cannot be used in the optical disk drive 21. Accordingly, the CD-ROM emulator 12b is inserted between the existing CD-ROM utilization tool 12a and the BIOS 92 of the magneto-optical disk. The CD-ROM emulator 12b performs monitoring to determine whether the BIOS call (a data read instruction, etc.) is being sent from the existing CD-ROM utilization tool 12a to the CD-ROM BIOS 91 (which actually does not exist). If the BIOS call has been issued, the CD-ROM emulator 12b changes the destination accessed to the magneto-optical disk drive 21. By adopting this arrangement, read-out of the publication data 13a from the second section 13 of the magneto-optical disk 11 (FIG. 8) is performed when the existing CD-ROM utilization tool 12a is implemented. This saving area can be regarded as if it were a single CD-ROM.

② Flow of operation of CD-ROM emulator

Figure 20:
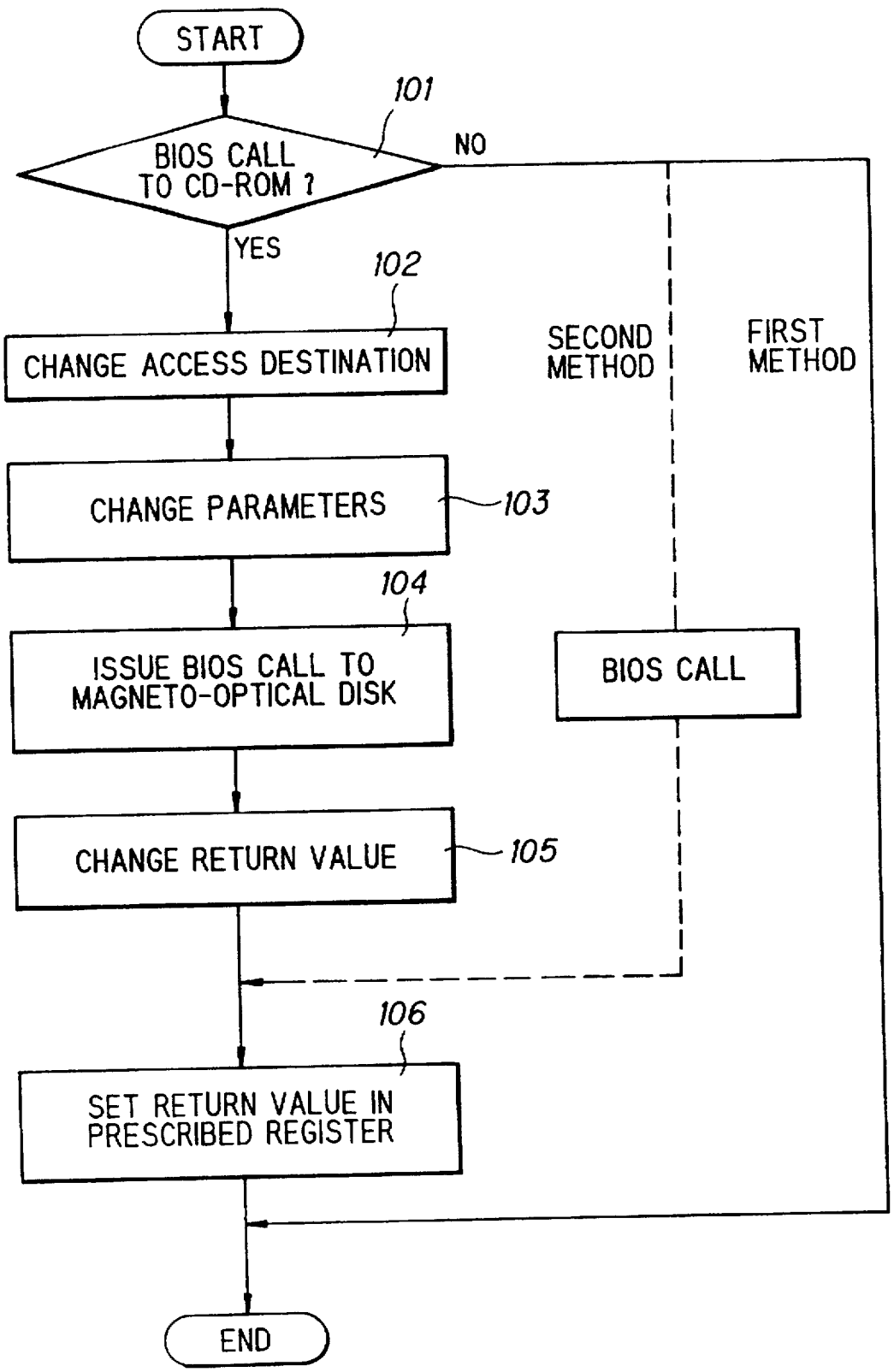
FIG. 20 is an operating flowchart of a CD-ROM emulator.

FIG. 20 is an operating flowchart of the CD-ROM emulator 12b.

The CD-ROM emulator 12b performs monitoring to determine whether the BIOS call has been issued to the CD-ROM (step 101). The BIOS call includes the number of the machine type, a command category number and parameters. The BIOS call is set in a prescribed register of the host system. The number of machine type specifies the type of machine desired to be accessed (e.g., the CD-ROM drive, magneto-optical disk drive, hard disk drive, display unit, keyboard, etc.). The command category number specifies read, write, seek, etc., and the parameters specify the starting address to be accessed, the number of items of data, etc. Accordingly, whether or not there is a BIOS call to the CD-ROM can be determined by referring to the machine type number contained in the BIOS call set in the register.

If there is a BIOS call to the CD-ROM, the destination to be accessed is changed from the CD-ROM to the magneto-optical disk (step 102). Next, parameters that need to be changed are changed to those for the magneto-optical disk (step 103). For example, in case of an instruction for reading y blocks of data from an x-th block of the CD-ROM, a block number x40 of the magneto-optical disk in which the x-th item of data of the CD-ROM has been recorded and a number y' of blocks to be read are calculated, and the parameters x, y are changed to x', y'. Letting A represent the first block number of the area (the second section) 13 for saving publication data, and assuming that the length of one block of data in the magneto-optical disk 11 is 512 bytes, we have $$x'=A+4 \cdot x$$

$$y'=4 \cdot y$$

When the processing for changing the parameters ends, the CD-ROM emulator 12b calls the magneto-optical disk BIOS 92 by the BIOS call having the changed parameters (step 104). As a result, the magneto-optical disk BIOS 92 starts and the reading of data from the second section 13 is executed.

Upon the completion of the data reading operation, the value returned from the BIOS 92 of the magneto-optical disk is changed to a value for the CD-ROM (step 105). For example, in case of a request for data size (number of blocks), in actuality the size of the magneto-optical disk is returned and therefore this value is changed to the size of the CD-ROM. Next, the changed return value is set in a prescribed register and operation is concluded (step 106).

When the BIOS call is found to be other than that of the CD-ROM at step 101, the program is concluded without any processing being executed (first method). Alternatively, as indicated by the dashed line, no change is made to the BIOS call that is other than that of the CD-ROM and the BIOS 92 is called as is (second method). The second method is advantageous in that even if the CD-ROM emulator is registered in a computer, a BIOS call other than that of a CD-ROM can be used is the same way as usual.

③ Flow of different operation of CD-ROM emulator

Figure 21:
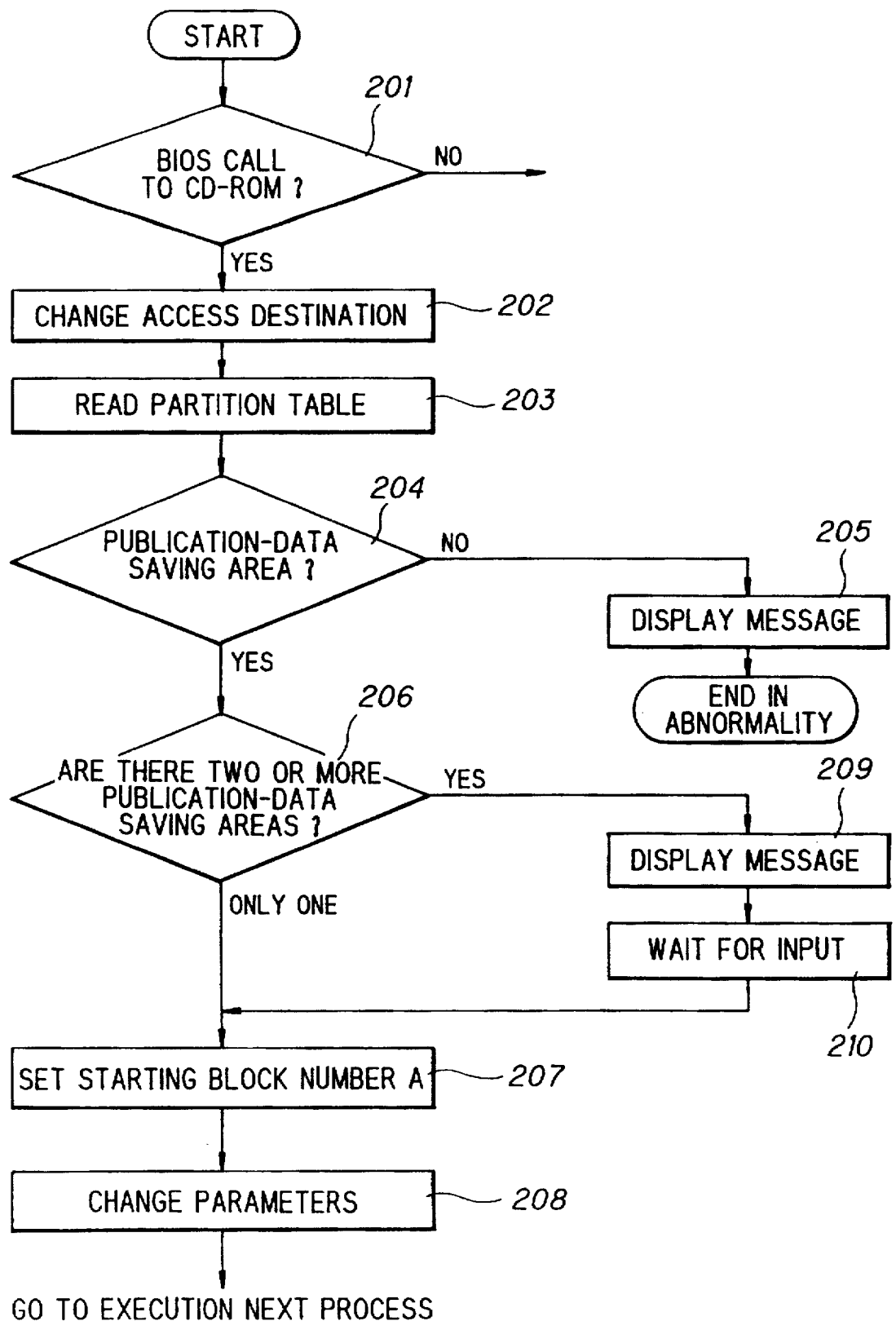
FIG. 21 is another operating flowchart of a CD-ROM emulator.

FIG. 21 is a different operating flowchart of the CD-ROM emulator 12b. This is an example in which, to make up for the fact that the CD-ROM emulator 12b does not possess the first block number A of the publication-data saving area (second section) 13, the first block (the first sector) of the publication-data saving area 13 is found by the section information that has been recorded in the section table area $11_4$ (see FIG. 6). This arrangement makes it possible to deal with a case in which a plurality of publication-saving areas (sections) exist, namely a case in which two or more publications have been recorded in separate sections.

The CD-ROM emulator 12 performs monitoring to determine whether the BIOS call to the CD-ROM has been issued (step 201). If there is a BIOS call to the CD-ROM, the destination to be accessed is changed from the CD-ROM to the magneto-optical disk (step 202). Next, the section information that has been recorded in the section table area $11_4$ (see FIG. 6) is read (step 203).

The section information is referred to in order to determine whether the publication-data saving area exists (step 204). In a case where the format information of a section is the CD-ROM format, it is judged that the publication-data saving area exists.

If the publication-data saving area does not exist, a message such as a warning is displayed on the display unit 51 (see FIG. 3) (step 205) and processing is concluded (error end). By thus ending processing in an error, meaningless processing can be terminated rapidly, erroneous operation can be prevented and processing time can be shortened.

If a publication-data saving area exists, then it is determined whether there are two or more publication-data saving areas (step 206). If there is one only one publication-data saving area, the starting block number of the publication-data saving area is found from the section information and set (step 207), and the BIOS call parameters that need to be changed are changed to those for the magneto-optical disk (step 208). Processing from step 104 in FIG. 20 is then executed.

In a case where there are two or more publication-data saving areas, a message prompting selection of a publication is displayed on the display unit 51 so that the user is allowed to select the publication used (step 209). When the publication has been selected (step 210), the starting block number A of the section of this publication is obtained from the section information and set (step 207). Processing from step 208 onward is then executed. This arrangement makes it easier to use publications on a magneto-optical disk.

It should be noted that the CD-ROM emulator 12b can be provided with the function of the decoding software 12c to combine these into a single item of software.

Embodiment of electronic publication on magneto-optical disk

Figure 22:
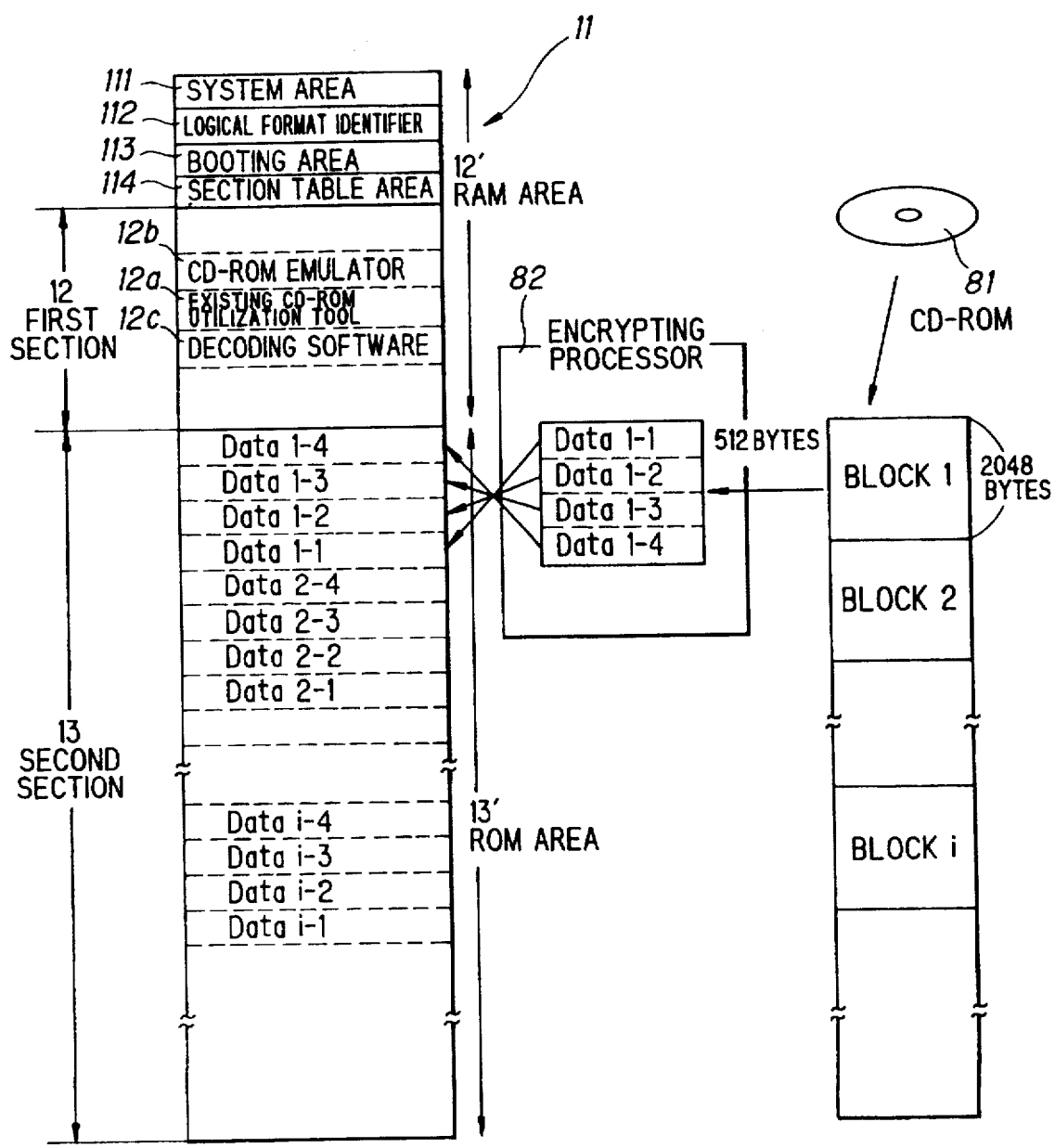
FIG. 22 is a diagram for describing an electronic publication on a magneto-optical disk according to the present invention.

FIG. 22 illustrates an embodiment of an electronic publication on a magneto-optical disk according to the present invention. Here data (publication data) on a CD-ROM has been encrypted and recorded in a publication-data saving area. Numeral 11 denotes the 3.5-inch magneto-optical disk medium having the construction of a partial ROM. The medium has the writable RAM area 12' and the ROM area 13' in which recording data is recorded by stamping in the form of pits. The magneto-optical disk medium 11 has a volume structure in which the RAM and ROM areas each have one section. The RAM area 12' has the system area $11_1$, the logical-format identifier area $11_2$, the booting area $11_3$ and the section table area $11_4$. Numeral 12 denotes the first section. In the ROM area 13', numeral 13 denotes the second section (the area for saving the publication data). Numeral 81 denotes the CD-ROM and 82 the encrypting processor.

The first section 12 is formatted according to ISO 9293 (MS-DOS). The existing CD-ROM utilization tool 12a, CD-ROM emulator 12b and decoding software 12c are recorded in this section. The publication data in accordance with the ISO 9660 format (the CD-ROM logical format) is encrypted and recorded in the second section 13 beforehand in the form of pits by means of stamping.

The encrypting of the publication data is carried out by the first encrypting method described in connection with FIG. 12. That is, data (2048 bytes) of the first block of the CD-ROM is divided into four items of data Data 1-1, Data 1-2, Data 1-3 and Data 1-4, each having a one-block data length (512 bytes), of the magneto-optical disk, and these items of data Data 1-1, Data 1-2, Data 1-3 and Data 1-4 are recorded in the second section 13 of the magneto-optical disk in reverse order. Similarly, data of an i-th block (i=1, 2, 3, 4, . . .) of the CD-ROM is divided into four items of data Data i-1, Data i-2, Data i-3 and Data i-4, each consisting of 512 bytes, and these items of data Data i-1, Data i-2, Data i-3 and Data i-4 are stored in the second section 13 of the magneto-optical disk in reverse order.

Control of magneto-optical-disk publication utilization

When the electronic publication 11 on the magneto-optical disk is set in the magneto-optical disk drive 21 (see FIGS. 3 and 4), the starting program (IPL) of the host system 31 scans the booting area $11_3$ (FIG. 22), finds the booting program that is suited to its own machine type and loads this booting program in the main memory of the system. As a result, control shifts from the starting program to the booting program that has been loaded. The booting program examines the section table area $11_4$ and finds a section capable of being started, namely the first section 12. The booting sector 17a-1 of the first section 12 is read in the main memory and control shifts to the IPL of this booting sector. The IPL of the booting sector loads the existing CD-ROM utilization tool 12a, the CD-ROM emulator 12b and the decoding software 12c, which have been stored in the first section 12, in the main memory. System start-up is thus completed.

Figure 23:
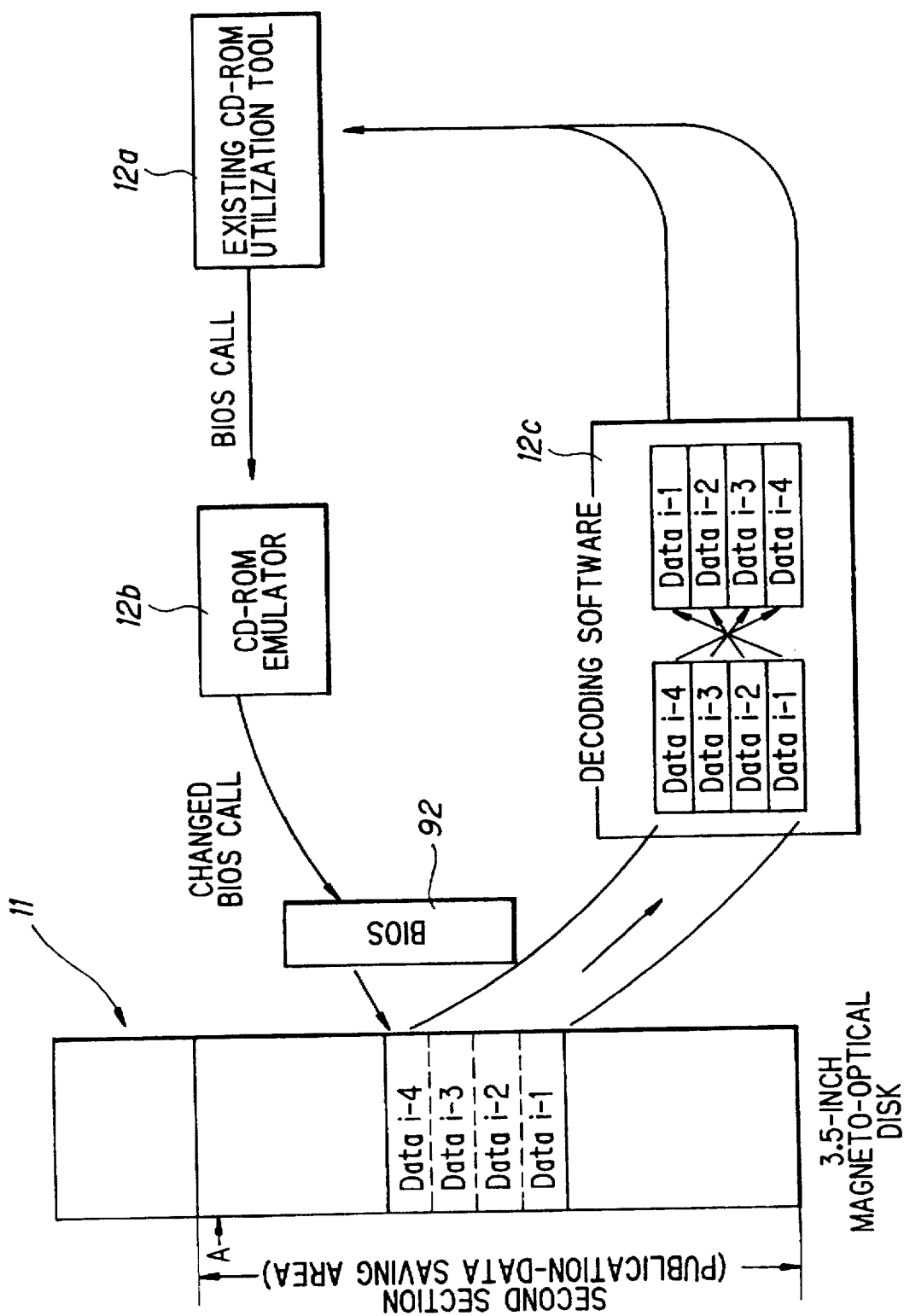
FIG. 23 is a diagram for describing a case in which an electronic publication on a magneto-optical disk is utilized by an existing CD-ROM utilization tool.

When the user employs the control panel 41 (FIG. 3) under these conditions to enter data for utilizing the electronic publication 11 of the magneto-optical disk, the existing CD-ROM utilization tool 12a is started. FIG. 23 is a diagram for describing a case in which an electronic publication on the magneto-optical disk is utilized by the existing CD-ROM utilization tool 12a.

The CD-ROM utilization tool 12a issues the BIOS call to the CD-ROM based upon the entered data. When the BIOS call to the CD-ROM is issued, the CD-ROM emulator 12b changes this BIOS call to a BIOS call to the magneto-optical disk 11 in accordance with the flowchart of FIG. 20 or 21. In a case where data is read, for example, the BIOS call to the CD-ROM contains the first block number x and the number y of blocks to be read. These parameters x, y are changed to a block number x' in the magneto-optical disk and a number y' of blocks to be read. As a result, the BIOS call to the CD-ROM is changed to the BIOS call to the magneto-optical disk. The parameters are changed in accordance with the following formula, where A represents the first block number of the area (the second section) 13 for saving publication data and the length of one block of data in the magneto-optical disk 11 is 512 bytes:

$$x'=A+4 \cdot x$$
$$y'=4 \cdot y$$

As a result of the foregoing, the magneto-optical disk BIOS 92 is started and the reading of y' items of data is executed from the prescribed block x' of the second section 13.

Figure 24:
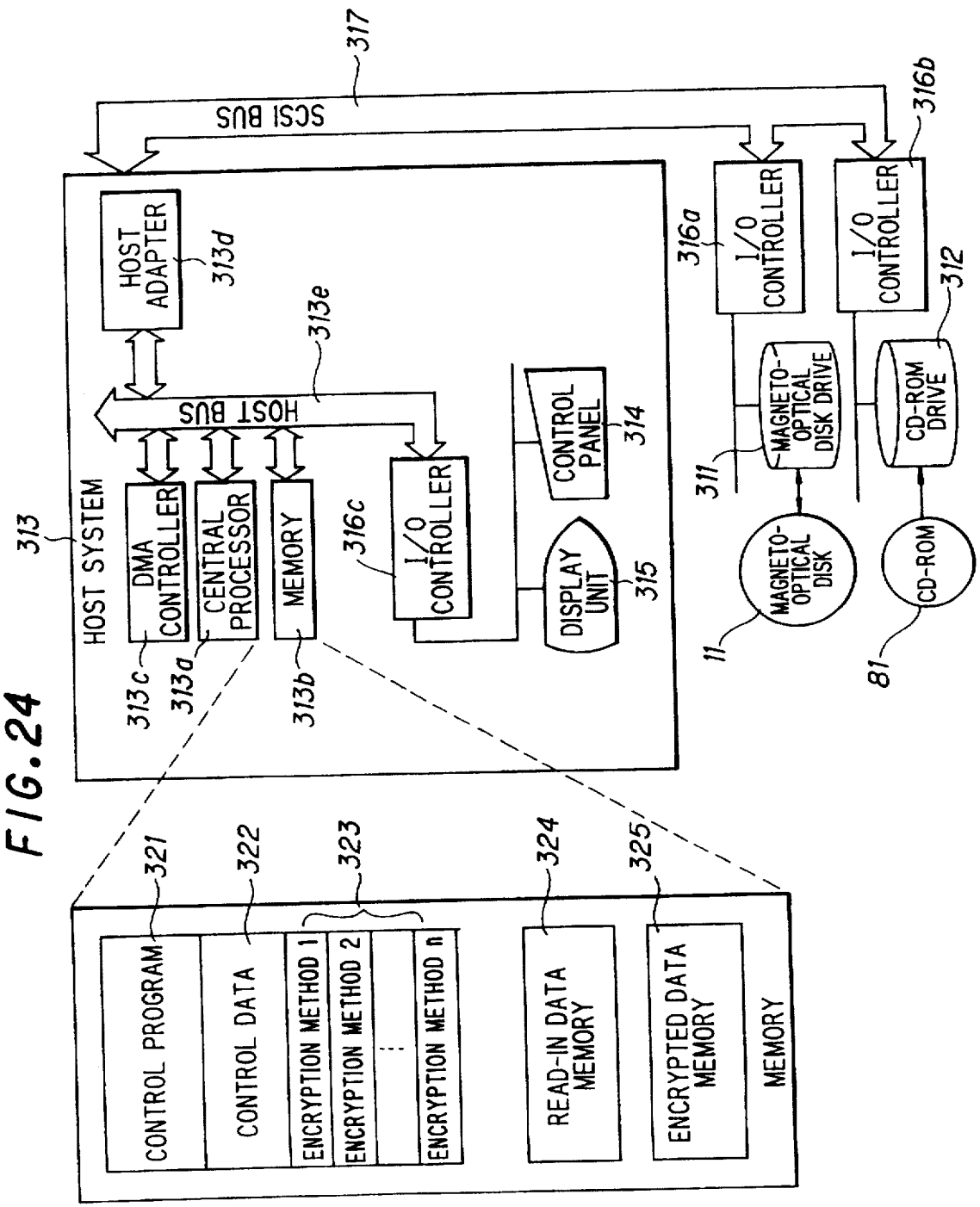
FIG. 24 is a diagram showing the configuration of an apparatus for creating electronic publications on a magneto-optical disk.

The decoding software 12c forms the block data that has been read into sets of four items each in regular order, rearranges these four items of block data Data i-4, Data i-3, Data i-2, Data i-1 in reverse order and delivers this data to the CD-ROM utilization tool 12a as data consisting of 2048 bytes. As a result, the CD-ROM utilization tool 12a causes the display unit 51 to successively display 2048-byte data combined in the order Data i-1, Data i-2, Data i-3, Data i-4. Apparatus for Creating Electronic Publications on Magneto-optical Disks (a) Overall configuration FIG. 24 is a diagram showing the overall configuration of an apparatus for creating electronic publications on a magneto-optical disk.

Numeral 11 denotes the magneto-optical (MO) disk medium, 81 the CD-ROM, 311 a magneto-optical disk drive, 312 a CD-ROM disk drive, 313 a host system (the main body of a computer), 316a, 316b I/O controllers and 317 an SCSI bus. The magneto-optical disk medium 11 is assumed to be a full RAM disk for the sake of this description.

The host system 313 includes a central processing unit (CPU) 313a, a memory 313b, a DMA controller 313c, a host adapter 313d, a data input unit (control panel) 314, a display unit 315 such as a CRT or liquid-crystal display, and an I/O controller 316c.

The central processing unit (CPU) 313a, memory 313b, DMA controller 313c, host adapter 313d and I/O controller 316c are connected to a host bus 313e. The host system 313 is connected to the I/O controllers 316a, 316b by an SCSI interface.

The memory 313b is provided with a control-program storage area 321, a control-data storage area 322, an encryption-method storage area 323 for storing various encryption programs, a read-in data storage area 324 for storing data read from a magneto-optical disk or CD-ROM, and an encrypted-data storage area 325 for storing encrypted publication data.

(b) Processing for creating electronic publications on magneto-optical disks

Figure 25:
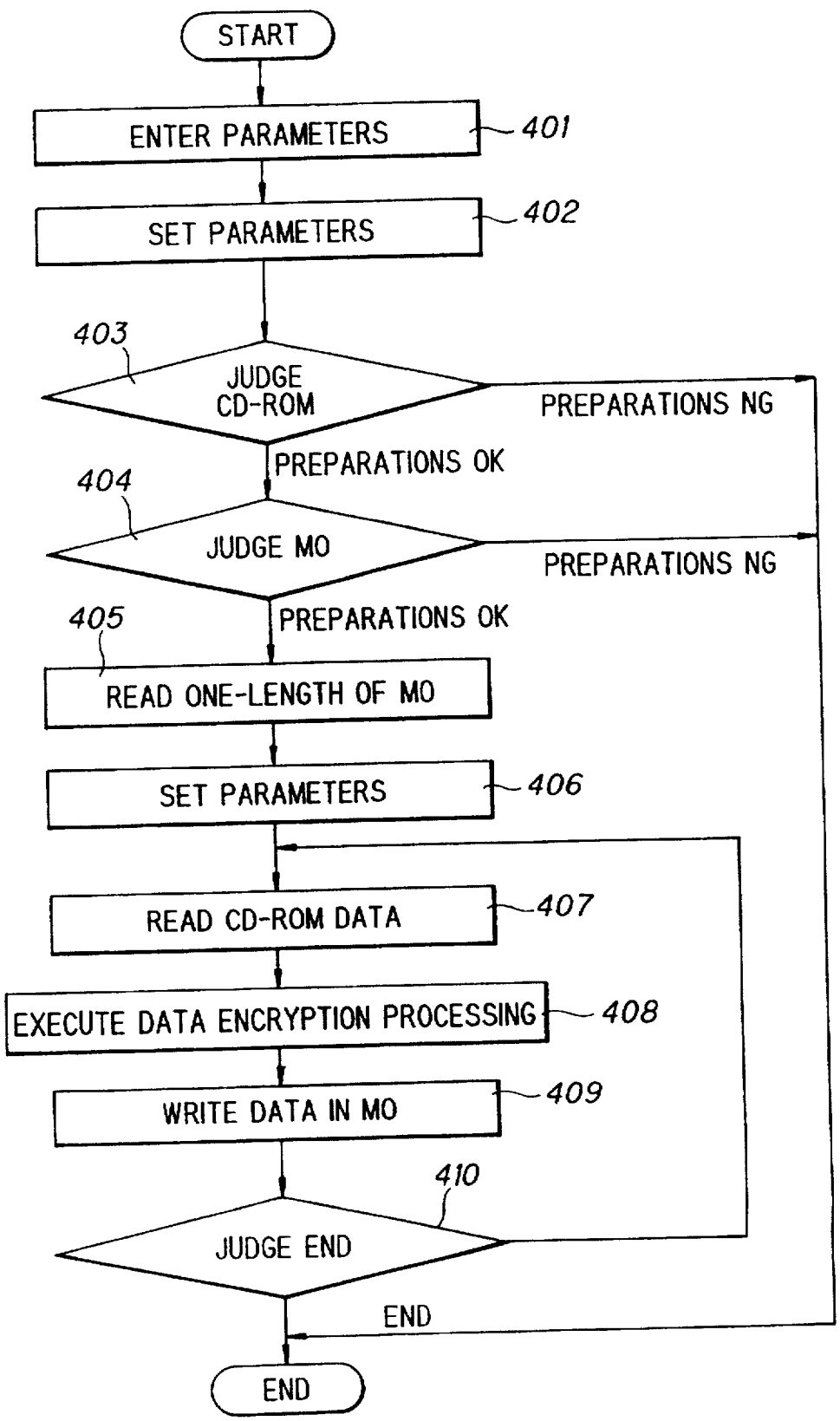
FIG. 25 is a flowchart of processing for creating electronic publications on a magneto-optical disk.

FIG. 25 is a flowchart illustrating processing for creating an electronic publication on a magneto-optical disk. It is assumed that the magneto-optical disk medium 11 has already been formatted and has the first and second sections 12, 13, respectively.

First, parameters necessary for creating an electronic publication on a magneto-optical disk are entered from the control panel 314 (step 401). Examples of the parameters are ① the SCSI number of the magneto-optical disk drive 311, ② the SCSI number of the CD-ROM drive 312, ③ the write location (the first block number A) at which publication data is written on the magneto-optical disk 11, and ④ the method of encrypting the publication data.

When these parameters are entered, the CPU 313a stores them in the control-data storage area 322 as control data (step 402).

Next, the CPU 131a determines whether the prevailing state is one in which data may be read from the CD-ROM (step 403). For example, the CPU 131a determines whether the entered SCSI number of the CD-ROM drive 312 is correct, whether the CD-ROM drive is normal and whether the CD-ROM 81 has been loaded.

Processing is terminated if the prevailing state is not one in which data may be read from the CD-ROM. However, if the prevailing state is one in which data may be read from the CD-ROM, then the CPU 131 determines whether the system is in a state in which data may be written in the magneto-optical disk medium 11 (step 404). For example, the CPU 131 determines whether the entered SCSI number of the magneto-optical disk drive 311 is correct, whether the magneto-optical disk drive is normal and whether the magneto-optical disk medium 11 has been loaded.

Processing is terminated if the prevailing state is not one in which data may be written in the magneto-optical disk medium 11. However, if the prevailing state is one in which data may be written in the magneto-optical disk medium 11, then a number of bytes corresponding to one block in the magneto-optical disk medium are read (step 405) and this data is stored in the control-data storage area 322 (step 406).

Next, the CPU 313a refers to the control data, reads publication data from the CD-ROM one block at a time and stores the data in the read-in data storage area 324 (step 407). Thereafter, the block of publication data read from the CD-ROM is encrypted by the designated encrypting method, the encrypted data is stored in the encrypted-data storage area 325 (step 408) and is written in the second section of the magneto-optical disk 11 one block at a time (step 409). At the completion of writing, the CPU 313a determines whether all of the publication data has been written in the magneto-optical disk medium 11 (step 410). If all of the data has not been written, the processing from step 407 onward is repeated. In response to the writing of all publication data, the CPU 313a terminates processing for creating an electronic publication on a magneto-optical disk.

It should be noted that an arrangement may be adopted in which data of a prescribed number of blocks is read from the CD-ROM and stored in the write-data storage area 324 en masse, the data is encrypted and then stored in the encrypted-data storage area 325, the encrypted data is written in the magneto-optical disk medium 11 when the encrypting of all data is completed, and this operation is repeated to encrypt all of the publication data and written the encrypted data in the magneto-optical disk medium.

Modification (a) Prevention of copying by stamper ID

In the second embodiment (FIG. 15B) of the decoding software, a case is described in which the keyword KWD (stamper ID) is stored in an area, such as the control zone 15a (FIG. 16) of the disk, not freely accessible by the user. The purpose of this is to prevent the copying of publication data. The stamper ID is effective in preventing the copying not only of electronic publications on a magneto-optical disk but also of ordinary data and programs that have been stored on a magneto-optical disk.

① First example of application

Figure 26A:
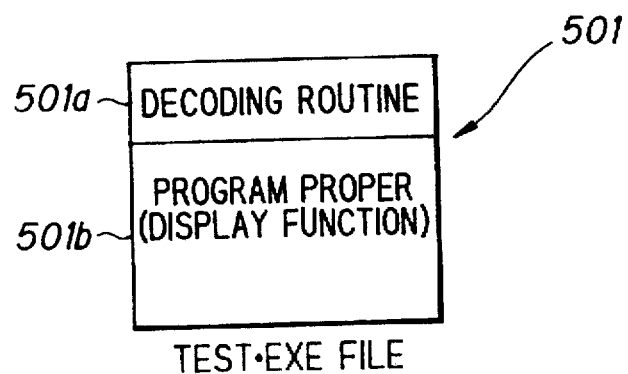
FIGS. 26A, 26B are diagrams for describing the prevention of copying by a stamper ID.

Assume that a stamper ID is obtained by combining a 10th byte, 25th byte, 200th byte and 490th byte of a prescribed block in the control zone 15a of the magneto-optical disk. An imperative file TEST.EXE encrypted using this stamper ID as a key is recorded in the ROM area of the magneto-optical disk (assumed to be a partial ROM, by way of example). As shown in FIG. 26A, a TEST.EXE file 501 has a structure in which a decoding routine 501a, which is for interpreting a code, is placed at the head of the file, and a program body (display function) 501b is placed after the decoding routine.

Figure 27:
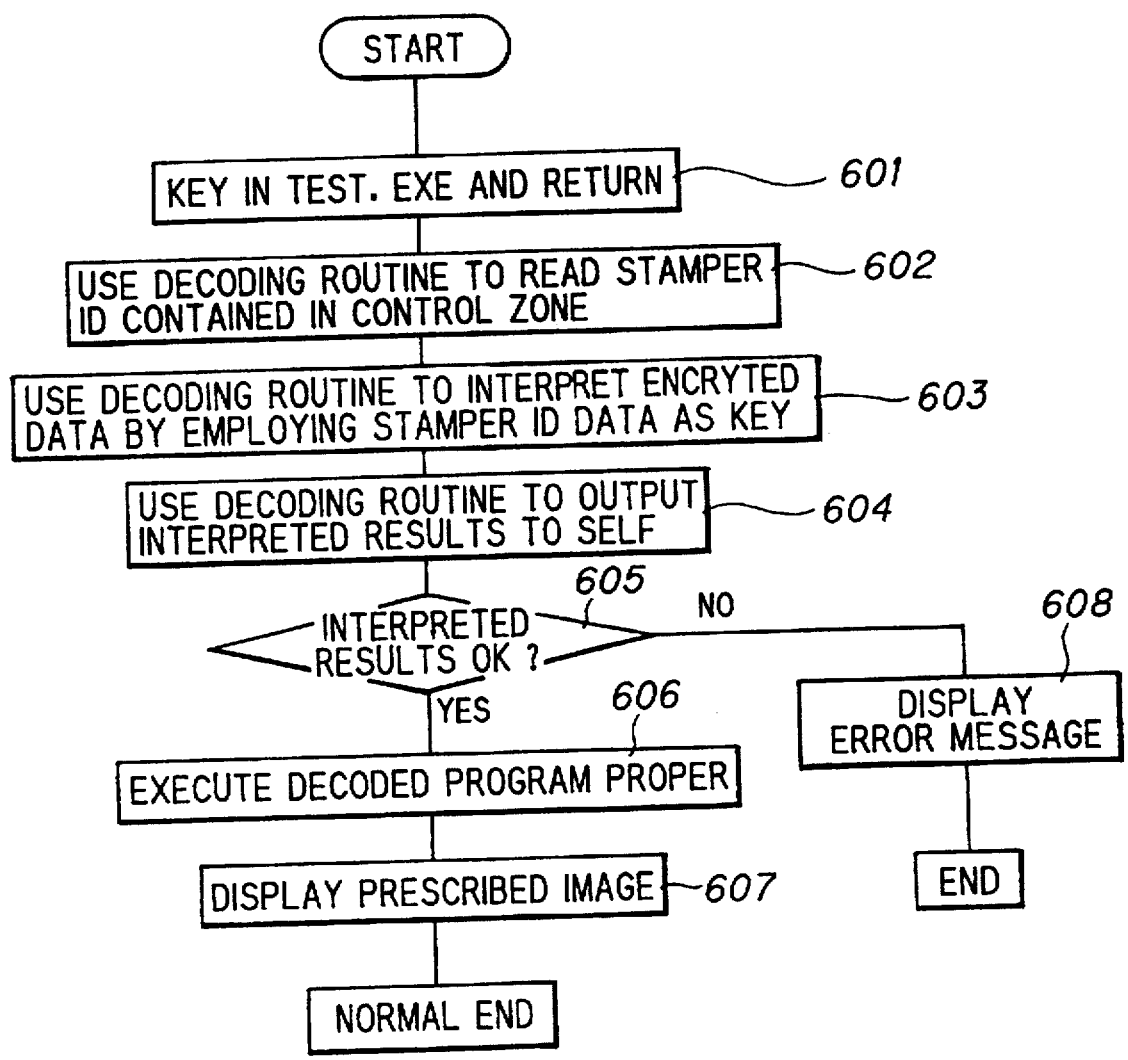
FIG. 27 is a flowchart of processing for preventing copying by a stamper ID.

FIG. 27 is a flowchart of processing for when the TEST.EXE file 501 is executed. This flowchart includes processing which uses the stamper ID to prevent copying.

First, TEST.EXE, which is to be executed, is entered from the keyboard, after which the return key is pressed (step 601). As a result, the TEST.EXE file is started. Since the decoding routine 501a has been placed at the beginning of the TEST.EXE file, the decoding routine operates first.

The address at which the stamper ID resides has been recorded in the decoding routine 501a. The data (stamper ID), therefore, is read out from this address (step 602). In this embodiment, it is assumed that the address of the stamper ID is block number BN=−150. Further, for the sake of convenience, the 0 sector of track 3 in FIG. 16 is set such that the block number BN=0 holds. Accordingly, BN=−150 indicates a block in the control zone 15a on the inner circumference. The decoding routine 501a reads data (the stamper ID) constituted by a 10th byte, 25th byte, 200th byte and 490th byte of the block at BN=−150. In the case of an original magneto-optical disk (original disk), the read data (stamper ID) is suited to decoding.

Next, the encrypted program body 501b is interpreted (decoded) using the read data (stamper ID) (step 603). At the end of decoding, the decoded results are outputted (step 604). Accordingly, it is determined whether the decoded results are O.K. (step 605). If the decoded results are O.K., i.e., if the magneto-optical disk medium is the original disk, then the decoded program body is subsequently executed (step 606), a prescribed image is displayed on the display (step 607) and processing is terminated.

If it is found at step 605 that the decoded results are N.G. (not O.K.), then the decoding routine 501a displays an error message (step 608) and processing is terminated. When the decoded results are N.G., this represents a case in which the TEST.EXE file 501 has been executed by being copied from the original disk to a magneto-optical disk that has been manufactured by another stamper. In such case, even if the decoding routine 501a reads the data constituted by a 10th byte, 25th byte, 200th byte and 490th byte of the block at BN=−150 of the control zone 15a, this data will differ from the stamper ID of the original copy. As a consequence, even if decoding is performed using this data, the decoding cannot be performed correctly and the decoded results will be N.G. The decoding routine 501a receives these results and displays an error message such as one reading "WILL NOT OPERATE BECAUSE THIS IS UNLAWFUL COPY OF ANOTHER DISK". Processing is then terminated.

Thus, even if a program or the like is copied to another magneto-optical disk medium, the copied program cannot be run. In effect, unlawful copying can be prevented.

② Second example of application

Figure 26B:
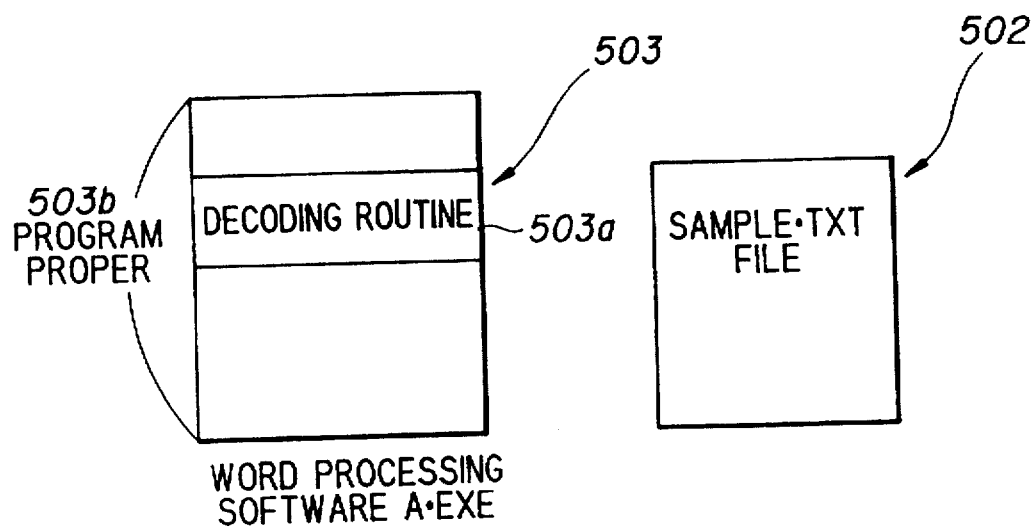

As shown in FIG. 17, a stamper ID is recorded in the 10th byte, 25th byte, 200th byte and 490th byte in a prescribed block of the control zone 15a in the magneto-optical disk. Further, data file SAMPLE.TXT, which has been encrypted using this stamper ID as a key, is recorded in the RAM area of the magneto-optical disk (assumed to be a partial ROM, for example), and word processor software A.EXE is recorded in the ROM area of this magneto-optical disk. As shown in FIG. 26B, a SAMPLE.TXT file 502 is a business trip report encrypted by the stamper ID; it does not possess a decoding routine. Word processor software A.EXE 503 is for reading in the SAMPLE.TXT file. A decoding routine 503a, which is for interpreting the code, is placed within the word processor software A.EXE 503.

Figure 28:
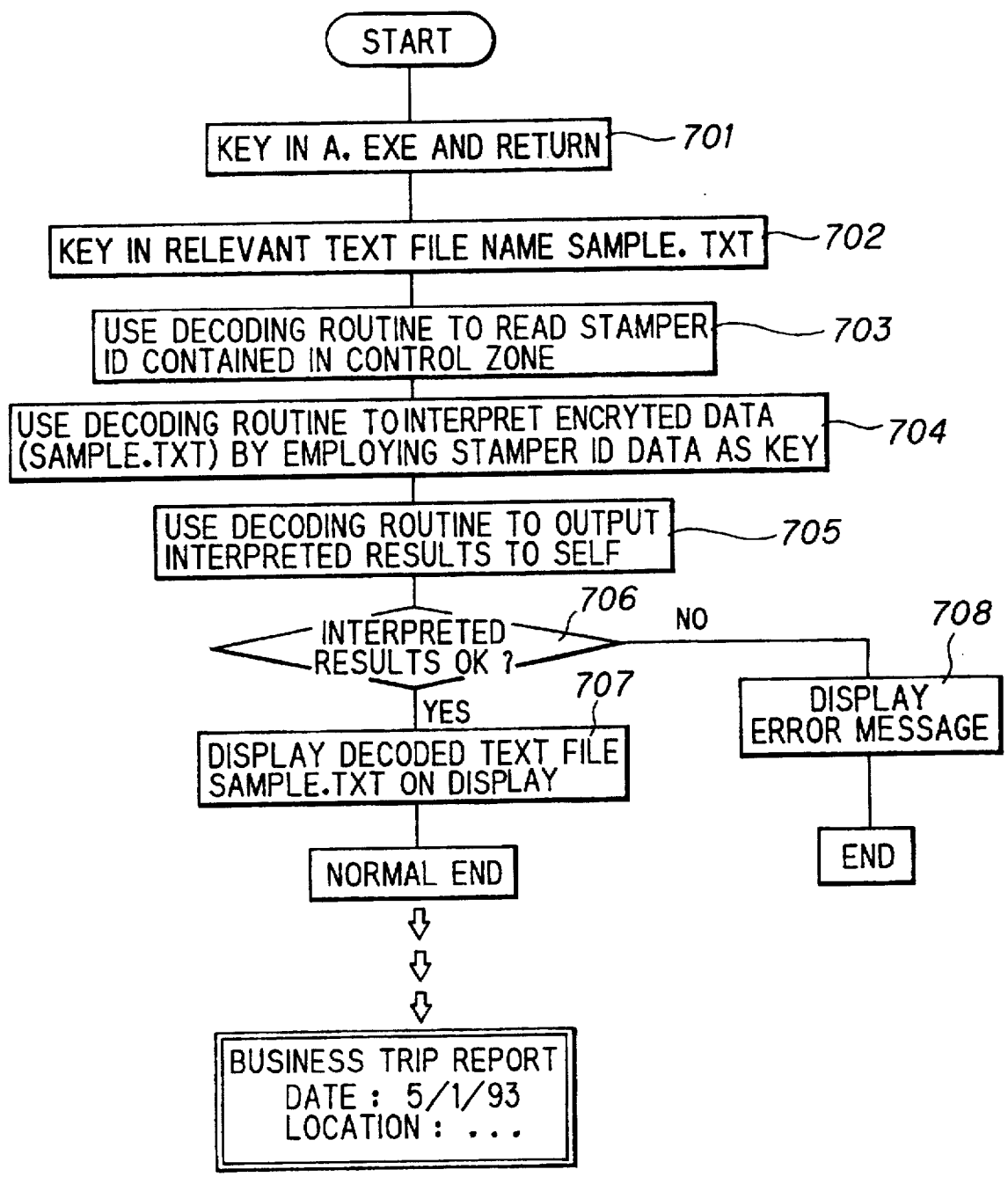
FIG. 28 is another flowchart of processing for preventing copying by a stamper ID.

FIG. 28 is a flowchart of processing for when the SAMPLE.TXT file 502 is executed. This flowchart includes processing which uses the stamper ID to prevent copying.

First, A.EXE is entered from the keyboard, after which the return key is pressed (step 701). As a result, the A.EXE file 503 is started. Since the A.EXE file initially requests a relevant text file, the relevant text file name SAMPLE.TXT is entered from the keyboard (step 702).

Since the decoding routine 503a has been placed within the A.EXE file 503, this decoding routine is run. The address at which the stamper ID resides has been recorded in the decoding routine 503a. The data (stamper ID), therefore, is read out from this address (step 703). In this embodiment, it is assumed that the address of the stamper ID is block number BN=−150. The decoding routine 501a reads data (the stamper ID) constituted by a 10th byte, 25th byte, 200th byte and 490th byte of the block at BN=−150.

Next, the encrypted text file SAMPLE.TXT is interpreted (decoded) using the read data (stamper ID) (step 704). At the end of decoding, the decoded results are outputted (step 705). Accordingly, it is determined whether the decoded results are O.K. (step 706). If the decoded results are O.K., then the decoded text file SAMPLE.TXT is displayed (step 707) and control shifts to the main body of the word processing software A.EXE.

If it is found at step 706 that the decoded results are N.G., then the decoding routine 503a displays an error message (step 708) and processing is terminated. When the decoded results are N.G., this represents a case in which the text file SAMPLE.TXT and word processing software A.EXE have been executed by being copied from the original disk to a magneto-optical disk that has been manufactured by another stamper. In such case, even if the decoding routine 503a reads the data constituted by a 10th byte, 25th byte, 200th byte and 490th byte of the block at BN=−150 of the control zone 15a, this data will differ from the stamper ID of the original disk. As a consequence, even if decoding is performed using this data, the decoding cannot be performed correctly and the decoded results will be N.G. The decoding routine 503a receives these results and displays an error message such as one reading "WILL NOT OPERATE BECAUSE THIS IS UNLAWFUL COPY OF ANOTHER DISK". Processing is then terminated. In other words, even if a text file is copied to another magneto-optical disk medium, the copied text file cannot be read. In effect, unlawful copying can be prevented.

Thus, if the stamper ID is recorded in the form of pits, then the stamper ID cannot be written in a disk that is the destination of a copying operation. This means that even if an encrypted program or data is copied unlawfully from an original disk to another disk, decoding cannot be carried out. As a result, the copied program or data is rendered meaningless. In effect, this prevents unlawful copying.

③ Third example of application

In the first and second examples of application, cases are described in which a stamper ID necessary for decoding is recorded, in the form of pits, in a control zone of the magneto-optical disk. However, the stamper ID can be recorded as pits not only in the control zone but also in the ROM portion of a partial ROM disk.

Figure 29:
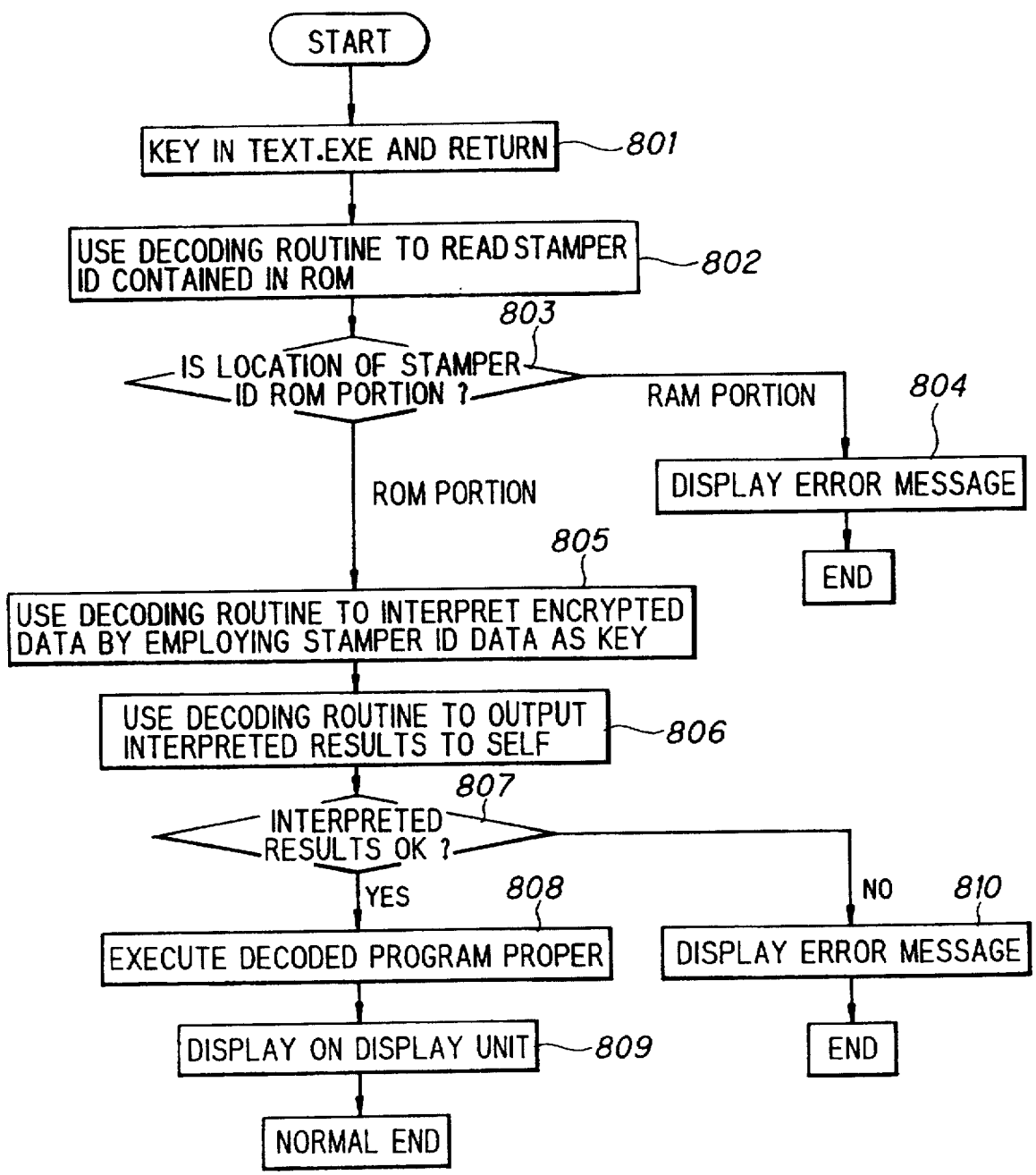
FIG. 29 is yet another flowchart of processing for preventing copying by a stamper ID.
Figure 30A:
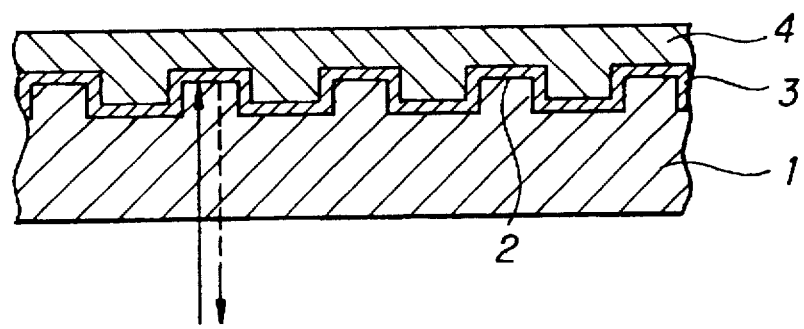
FIGS. 30A, 30B are diagrams for describing a CD-ROM.
Figure 30B:
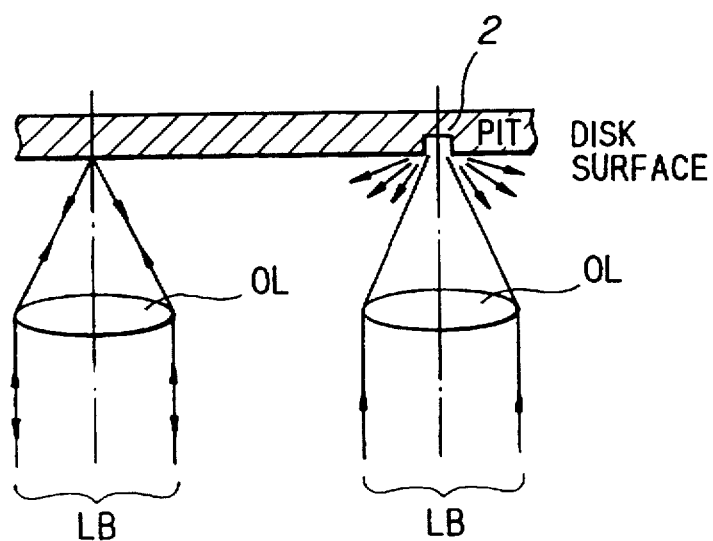
Figure 31A:
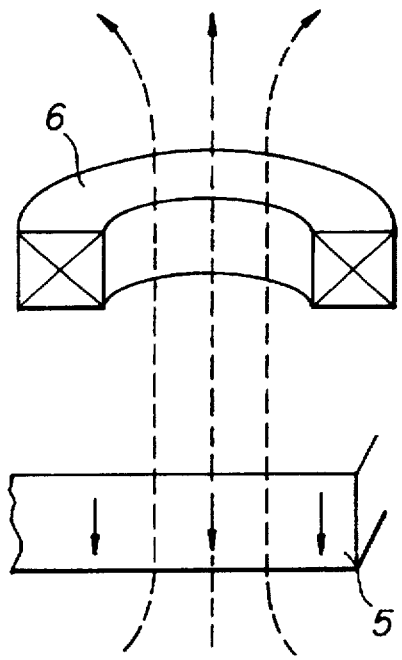
FIGS. 31A, 31B, 31C are diagrams for describing writing/reading of a magneto-optical disk.
Figure 31B:
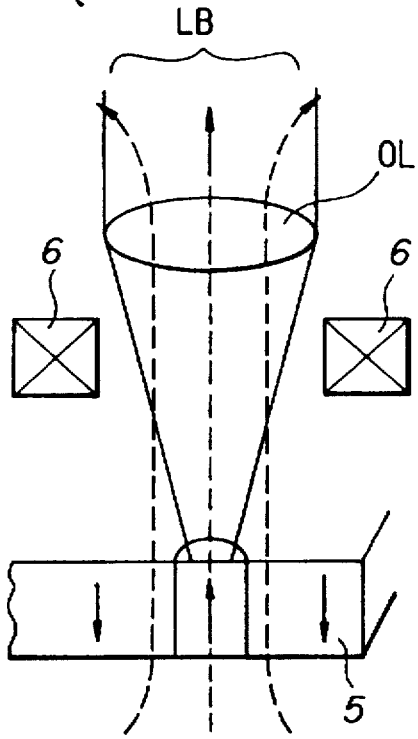
Figure 31C:
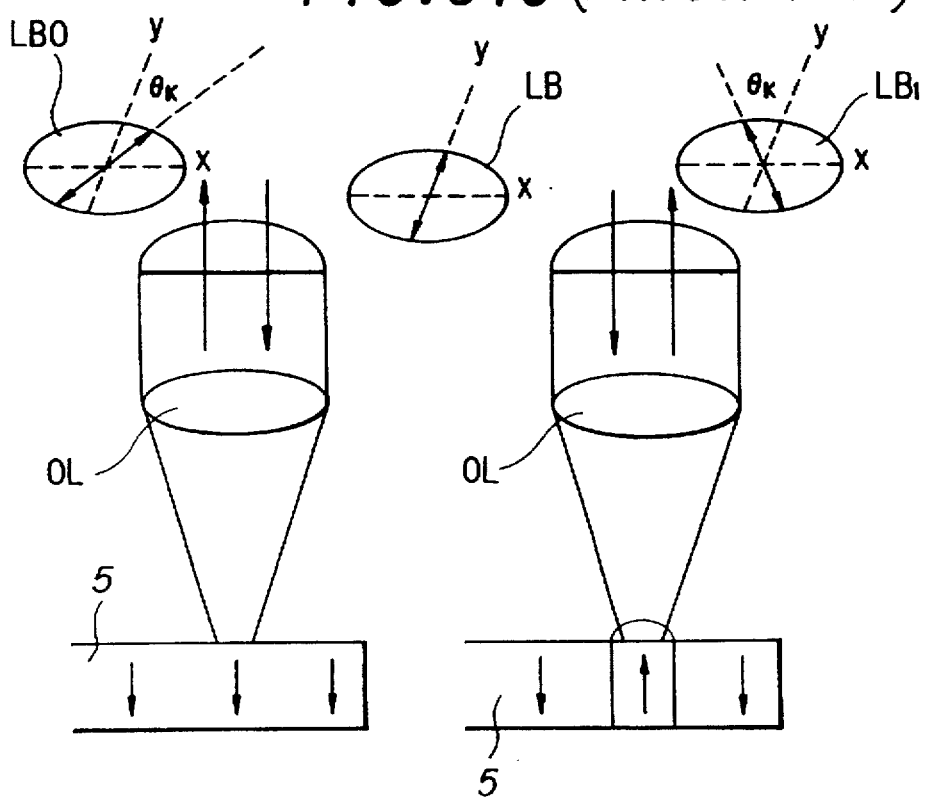
Figure 32A:
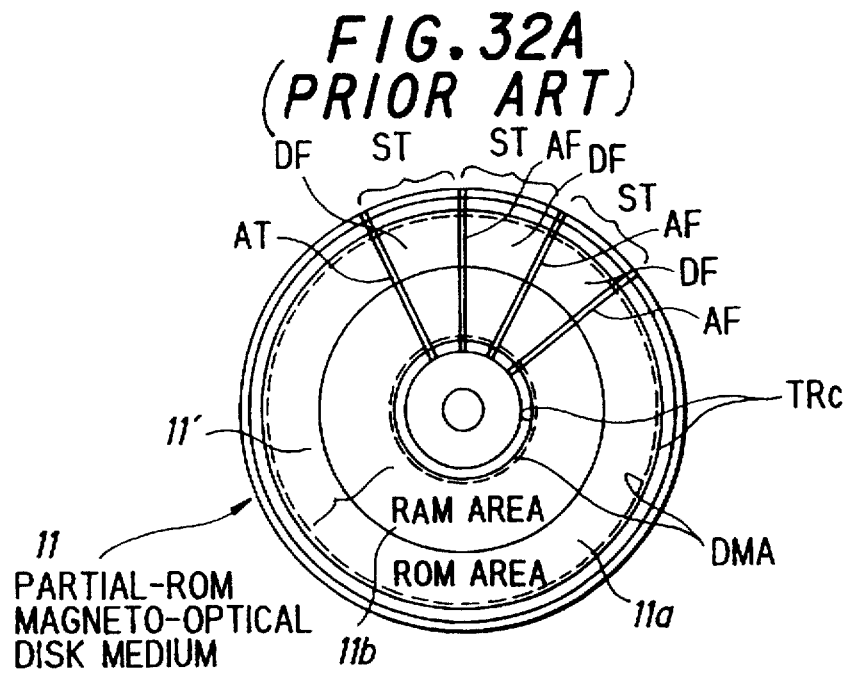
FIGS. 32A, 32B, 32C are diagrams showing the structure of a partial-ROM magneto-optical-disk medium.
Figure 32B:
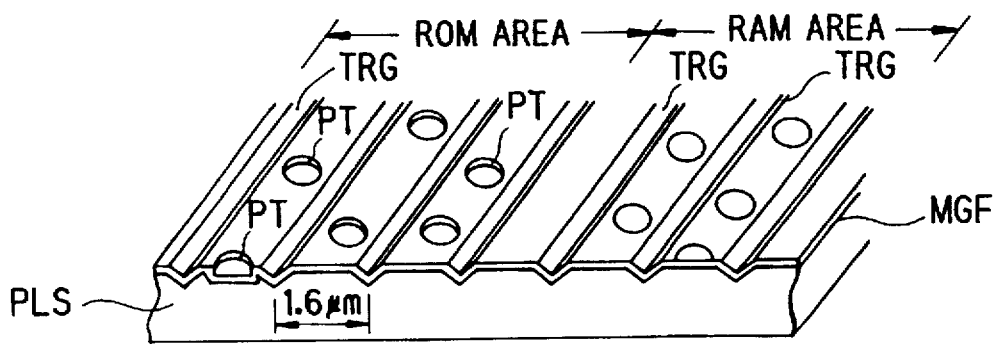
Figure 32C:
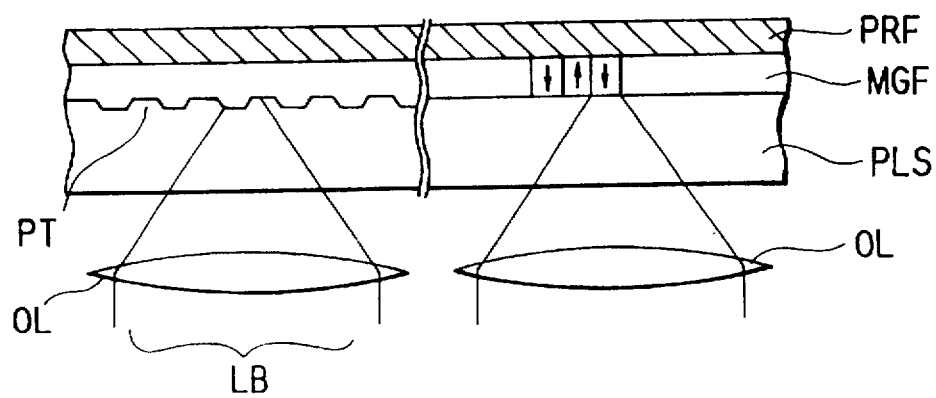

FIG. 29 is a flowchart of processing for when the TEST.EXE file 501 (see FIG. 26A) is executed in a case where the stamper ID has been recorded in the ROM portion. Here the stamper ID is recorded in block BN=225000, by way of example.

First, TEST.EXE, which is to be executed, is entered from the keyboard, after which the return key is pressed (step 801). As a result, the TEST.EXE file is started. Since the decoding routine 501a has been placed at the beginning of the TEST.EXE file 501, the decoding routine operates first.

The address (BN=225000) at which the stamper ID resides has been recorded in the decoding routine 501a. The data (stamper ID), therefore, is read out from this address (step 802). Next, it is determined whether the storage location (block number BN=225000) of the stamper ID is the ROM portion or not (step 803) If the storage location is the RAM portion and not the ROM portion, this means that an unlawful copy was made from the original magneto-optical disk (original disk) to another disk. In such case, an error message such as one reading "WILL NOT OPERATE BECAUSE THIS IS UNLAWFUL COPY OF ANOTHER DISK" is displayed (step 804) and processing is terminated.

If the storage location of the stamper ID is the ROM portion, on the other hand, the encrypted program body 501b is interpreted (decoded) using the read data (stamper ID) (step 805). At the end of decoding, the decoded results are outputted (step 806). Accordingly, it is determined whether the decoded results are O.K. (step 807). If the decoded results are O.K., i.e., if the magneto-optical disk medium is the original copy, then the decoded program body is executed (step 808), a prescribed image is displayed on the display unit (step 809) and processing is ended.

If it is found at step 807 that the decoded results are N.G. (not OK), then the decoding routine 501a displays an error message (step 810) and processing is terminated. When the decoded results are N.G., this represents a case in which the TEST.EXE file 501 has been executed by being copied from the original disk to a magneto-optical disk that has been manufactured by another stamper. In such case, even if the decoding routine 501a reads out the data in block number BN=225000 of the ROM portion, this data will differ from the stamper ID of the original disk. As a consequence, even if decoding is performed using this data, the decoding cannot be performed correctly and the decoded results will be N.G. The decoding routine 501a receives these results and displays an error message such as one reading "WILL NOT OPERATE BECAUSE THIS IS UNLAWFUL COPY OF ANOTHER DISK". Processing is then terminated.

Thus, even if a program or the like is copied to another magneto-optical disk medium, the stamper ID cannot be copied. As a result, a copied program cannot be run. This effectively prevents unlawful copying. In order to make it possible to run an unlawfully copied program, it is required that the location (BN=225000) of the stamper ID be made the ROM portion and that the stamper ID be recorded in the form of pits. To accomplish this, however, it would be necessary to create a stamper for manufacturing a magneto-optical disk. This would involve enormous expense and would be impossible for an individual not having manufacturing facilities.

Though an example of imperative software TEST.EXE is illustrated above, use of an unlawful copy can be prevented, even in a case where SAMPLE.TXT shown in FIG. 26B is executed, by determining whether the storage location of the stamper ID is a ROM or not.

(b) Modification of electronic publication on magneto-optical disk

① As set forth above, the existing CD-ROM utilization tool 12a, the CD-ROM emulator 12b and the decoding software 12c are stored in the first section 12 of the magneto-optical disk. However, these need not necessarily be written in the magneto-optical disk. For example, they can be stored in another storage medium such as a hard disk or floppy disk.

② Further, though a case has been described in which the present invention is applied primarily to a partial ROM, the invention is applicable also to an optical disk such as a full RAM disk or full ROM disk.

③ Furthermore, the present invention is applicable also to optical disks other than magneto-optical disks. These include perforated-type optical disks, organic optical disks and PHB optical disks.

④ Further, the present invention is applicable also to IC memory, floppy disks or the like other than optical disk.

⑤ Furthermore, though a case has been described in which the publication data which CD-ROM logical format is stored in the second section of the recording medium, it is also possible store the publication data with a predetermined format such as CD-I (CD-Interactive) logical format and the like in the second section.

In accordance with the present invention as described above, it is arranged to record publication data on an optical disk in a CD-ROM logical format, provide first software (an existing CD-ROM utilization tool) that utilizes publication data in the CD-ROM logical format and second software (a CD-ROM emulator) for converting an access request for access to a CD-ROM logical section issued by the first software to a request for access to the optical disk. When the request for access to the CD-ROM logical section.has been issued by the first software, the second software converts this access request to the request for access to the optical disk and reads the publication data out of the optical disk. As a result, publication data that has been accumulated as electronic publications on a CD-ROM can be utilized as is and it is possible to eliminate time for creating publication data, time for developing and creating conversion tools for converting publication data in the CD-ROM logical format to another format, such as MS-DOS, and time for performing the converting operation.

Further, according to the present invention, it is possible to read publication data in the CD-ROM logical format, which data has been written in a publication-data saving area of an optical disk, when the software of the existing CD-ROM utilization tool is implemented. This saving area can be regarded as if it were a single CD-ROM. As a result, a publication utilization tool for an optical disk need not be developed and created on the developer side, and a CD-ROM utilization tool used thus far can be employed directly as the utilization tool of an optical disk publication on the user side.

Further, according to the present invention, an optical disk is provided with a ROM area exclusively for playback, in which publication data in the CD-ROM logical format is recorded in the form of pits on a plastic disk by means of stamping, and with a rewritable RAM area obtained by coating the remainder of the disk with a magnetic film. As a result, the publication data can be recorded en masse by stamping, thus eliminating the need for performing an electrical writing operation each time. This facilitates the creating of electronic publications on an optical disk and makes provision possible in less time and at lower cost.

Further, in accordance with the present invention, publication data is encrypted and then recorded in a publication-data saving area. As a result, even if publication data is copied unlawfully, the copied data will be meaningless. This effectively prevents unlawful copying.

Furthermore, in accordance with the present invention, data necessary for decoding encrypted publication data is recorded beforehand in an area not accessible to the user, and the encrypted publication data is decoded using this data. As a result, even if encrypted publication data and decoding software area are copied, the original publication data cannot be restored. This makes it possible to prevent unlawful copying very effectively.

Further, information in general, such as a program or data, not limited to electronic publications is recorded on an optical disk upon being encrypted, and data (a stamper ID) necessary for decoding the encrypted information is recorded by stamping in an area that stores information in the form of pits, thereby constructing an optical disk medium. As a result, even if the encrypted program and data are copied unlawfully, data (the stamper ID) needed to restore the original information cannot be acquired. The copied information is thus meaningless, as a result of which unlawful copying is prevented in an effective manner.

Furthermore, in accordance with the present invention, an optical disk is divided into a plurality of sections at least one section of which is made a section (a first section) having a format different from a logical format of a CD-ROM, publication data is recorded in at least one section (a second section) of the sections other than the first section in accordance with the logical format of the CD-ROM, and first software (an existing CD-ROM utilization tool) that utilizes publication data in the logical format of the CD-ROM, second software (a CD-ROM emulator) for converting a request for access to a CD-ROM logical section issued by the first software to a request for access to the optical disk, and decoding software are recorded in the first section. As a result, it is possible to provide an environment in which electronic publications can be utilized on a single optical disk. This improves user friendliness greatly.

As many apparently widely different embodiments of the present invention can be made without departing from the spirit and scope thereof, it is to be understood that the invention is not limited to the specific embodiments thereof except as defined in the appended claims.

What is claimed is:

1. A recording medium for storing data with a predetermined physical format comprising:
   a first section for storing software;
   a second section for storing publication data converted to the predetermined physical format from an original physical format; and
   wherein said first section has an area for storing software for converting a command associated with the original physical format, for reading the publication data in accordance with the original physical format to a command associated with the predetermined physical format, for reading the publication data from said second section.

2. A recording medium according claim 1, wherein said publication data is stored in the second section while maintaining an original logical format.

3. A recording medium according claim 1, wherein the recording medium is an optical disk medium.

4. A recording medium according claim 1, wherein the original physical format is CD-ROM physical format.

5. A recording medium according to claim 1, wherein said publication data is encrypted and the encrypted publication data is stored in said second section.

6. A recording medium according to claim 5, wherein the publication data with the predetermined physical format is divided into a plurality of block units of the recording medium and the block units of publication data are stored in said second section by interchanging the order thereof to encrypt the publication data.

7. A recording medium according to claim 5, wherein the publication data with the predetermined physical format is encrypted, the encrypted data is divided into a plurality of block units of the recording medium, and the block units of encrypted publication data are recorded in said second section by interchanging the order thereof to encrypt the publication data.

8. A recording medium according to claim 5, further comprising a recording area for recording data specifying an encryption method of the publication data in the second section.

9. A recording medium according to claim 5, wherein said first section has an area for decrypting software for decrypting the encrypted and recorded publication data to its original form.

10. A recording medium according to claim 5, wherein the recording medium has an encryption-method recording area for recording data specifying an encryption-method of the publication data, and first section has a plurality of areas for items of decrypting software.

11. The recording medium according to claim 10, wherein said encryption-method recording area is provided at a location inaccessible to a user.

12. A recording medium for storing data with a predetermined physical format comprising:
   a first section for storing software;
   a second section for storing publication data converted to the predetermined physical format from an original physical format; and
   wherein said first section has separate areas for storing first software and second software, said first software generates a command for reading the publication data in accordance with the original physical format, and said second software converts said command associated with the original physical format for reading the publication data issued by the first software to a command associated with the predetermined physical format for reading the publication data from said second section in accordance with the predetermined physical format.

13. A recording medium according claim 12, wherein said publication data is stored in the second section while maintaining an original logical format.

14. A recording medium according to claim 12, wherein the recording medium for storing data is an optical disk medium.

15. A recording medium according to claim 12, wherein the original physical format is CD-ROM physical format.

16. A recording medium according to claim 12, wherein said second software converts a number of machine type specified by the command issued by the first software into a number of another machine type which designates a machine to be actually accessed.

17. A recording medium according to claims 12, wherein said second software converts a read-out starting block number and a read-out block count in the command issued by the first software into a read-out starting block number and a read-out block count in the command in accordance with the predetermined physical format.

18. A recording medium according to claim 12, wherein the length of the block in the predetermined physical format is different from the length of the block in the original physical format.

19. A recording medium according to claims 12, wherein the recording medium is an optical disk medium having a rewritable RAM section and a read-only ROM section, said ROM section for storing data in the form of pits created by stamping; and wherein said first section is provided on the RAM section and said second section is provided on the ROM section.

20. A method for processing publication data in an electronic publication system, comprising the steps of:
   (a) reading original publication data stored on an original recording medium in an original physical format by using first software;

(b) converting the publication data from the original physical format to a predetermined physical format;

(c) storing the converted data on a recording medium with the predetermined physical format;

(d) converting a command issued in accordance with the first software associated with the original physical format for reading the publication data to a command associated with the predetermined physical format for reading the converted publication data from the recording medium by using second software; and (e) reading the converted publication data from the recording medium in accordance with the converted command.

21. The method according to claim 20, wherein the recording medium is an optical disk medium.

22. The method according to claim 20, wherein the predetermined physical format is CD-ROM physical format.

23. The method according to claim 20, wherein said Step (d) converts a read-out starting block number and a read-out block count in the command associated with the original physical format into a read-out starting block number and a read-out block count in the command associated with the predetermined physical format.

24. The method according to claim 20, further comprising the steps of:

encrypting the publication data and writing the encrypted publication data on the recording medium;

reading decrypting software for decrypting the encrypted publication data on the recording medium; and decrypting the encrypted publication data, when it has been read from the recording medium, utilizing said decrypting software.

25. The method according to claim 21, wherein said original publication data is provided on the optical disk medium in the form of pits created by stamping.

26. The method according to claim 24, further comprising the steps of:

setting an area for recording specification data specifying an encryption method of the publication data;

reading the specification data in said area; and reading the specification data to locate decrypting software which conforms to the encryption method specified by said specification data.

27. An optical disk medium comprising:

a first area in which encrypted information is stored; and a second area for storing decryption key data for permitting decryption of the encrypted information, wherein information is recorded in the second area in the form of pits created by stamping.

28. The optical disk according to claim 27, comprising:

a RAM area in which information is rewritable; and a read-only ROM area in which information is recorded in the form of pits created by stamping, wherein the ROM area is provided with said first and second areas.

29. A method for processing publication data in an electronic publication system, the publication data being provided on an optical disk, comprising the steps of:

reading key data necessary for permitting decryption of said encrypted information on the optical disk;

reading decrypting software for decrypting said encrypted information; and decrypting said encrypted information, which has been read from the recording medium, using said decrypting software using said key data.

30. A method for processing publication data in an electronic publication system, the publication data being provided on a recording medium which is an optical disk, comprising the steps of:

reading encrypted information in a recording area of the optical disk;

reading key data necessary for permitting decryption of said encrypted information on an area where read-only information is recorded in the form of pits created by stamping;

determining whether the key data necessary for permitting decryption of the encrypted information is present in a read-only area when a read command for said encrypted information is issued; and refraining from executing decrypting if said key data is not present in the read-only area, and executing decrypting if said key data is present in the read-only area.

31. A system utilizing electronic publication, comprising:

a recording medium for storing publication data converted to a predetermined physical format from an original physical format;

first storage means for storing a first software for reading the publication data with the predetermined physical format;

second storage means for storing a second software for converting a command for reading the publication data issued by the first software to a command for reading the publication data from the recording medium in accordance with the predetermined physical format;

a medium drive for reading the publication data from the recording medium based upon the converted command; and a processing unit for storing the first and second software read from the first and second storage means, and for executing the first and second software by issuing the command for reading the publication data by the first software, and converting the command to a command for reading the publication data from the recording medium in accordance with the predetermined format.

32. A system according to claim 31, further comprising:

a control panel for entering data requesting utilizing of the publication data that has been stored in the recording medium; and a display unit for displaying the requested publication data after it has been read from the recording medium;

wherein the processing unit issues the command for reading the publication data in accordance with the first software based upon the data entered from the control panel, converts the command to a command for reading the publication data from the recording medium in accordance with the second software, and inputs publication data which has been read from the recording medium to the display unit.

33. A system utilizing electronic publication according to claim 31, wherein said publication data is stored in the recording medium in an original logical format.

34. The system utilizing electronic publication according to claim 31, wherein the recording medium is an optical disk medium.

35. The system utilizing electronic publication according to claim 31, wherein the predetermined physical format is CD-ROM physical format.

36. The system utilizing electronic publication according to claim 31, wherein said first storage means comprises a recording medium having a first section for storing the first software; and said recording medium has a second section for storing the publication data.

37. The system utilizing electronic publication according to claim 31, wherein said second storage means comprises a recording medium having a first section for storing the second software; and said recording medium has a second section for storing the publication data.

38. The system according to claim 31, wherein said second software converts a read-out starting block number and a read-out block count in the command issued by the first software in accordance with the original physical format into a read-out starting block number and a read-out block count in the command in accordance with the predetermined physical format.

39. The system according to claim 32, wherein said first and second storage means respectively comprise first and second sections of the recording medium;

said publication data is recorded on the second section of the recording medium in encrypted form;

decrypting software for decrypting said encrypted publication data is stored on the first section of the recording medium; and said processing unit reads and stores the decrypting software, decrypts the encrypted publication data read from the second section of the recording medium in accordance with said decrypting software, and inputs the decrypted publication data to said display unit.

40. A recording medium for storing data comprising:

a first section for storing software;

a second section for storing publication data; and separate areas in said first section for respectively storing first software and second software;

said first software generating a command for reading the publication data and said second software converting a machine type number specified by the command issued by the first software into another machine type number that designates a machine which is accessing the medium.

41. A method for processing publication data in an electronic publication system, comprising the steps of:

(a) reading first software for processing a command in accordance with an original physical format for reading an original publication data;

(b) reading second software when reading a converted publication data stored on a recording medium with a predetermined format;

(c) converting a command issued in accordance with the first software associated with the original physical format for reading the original publication data to a command associated with the predetermined physical format for reading the converted publication data from the recording medium by using said second software; and (d) reading the converted publication data from the recording medium in accordance with the converted command.

42. A method for processing publication data in an electronic publication system, the publication data being provided on a recording medium which is an optical disk, comprising the steps of:

reading key data necessary for permitting decryption of said encrypted information on an area where read-only information is recorded in the form of pits created by stamping, when reading encrypted information in a recording area of the optical disk;

determining whether the key data necessary for permitting decryption of the encrypted information is present in a read-only area when a read command for said encrypted information is issued; and refraining from executing decrypting if said key data is not present in the read-only area, and executing decrypting if said key data is present in the read-only area.

* * * * *

UNITED STATES PATENT AND TRADEMARK OFFICE
CERTIFICATE OF CORRECTION

PATENT NO. : 5,752,009
DATED : May 12, 1998
INVENTOR(S) : Nakahara et al.

It is certified that error appears in the above-identified patent and that said Letters Patent is hereby corrected as shown below:

Column 1, line 26, delete "a"

Column 8, line 37, delete "." (period)

Column 10, line 56, delete "③" and insert

--①-- therefor

Column 16, line 41, delete "x40" and insert

--x'-- therefor

Column 27, line 22, delete "starling" and insert --starting-- therefor

Signed and Sealed this

Twenty-third Day of March, 1999

Attest:

Q. TODD DICKINSON

*Attesting Officer*   *Acting Commissioner of Patents and Trademarks*